United States Patent [19]

Blum et al.

[11] Patent Number: 4,610,025

[45] Date of Patent: Sep. 2, 1986

[54] CRYPTOGRAPHIC ANALYSIS SYSTEM

[75] Inventors: Eric Blum, Wynnewood; Wilbur Pierce, Bryn Mawr, both of Pa.

[73] Assignee: Champollion Incorporated, Bala Cynwyd, Pa.

[21] Appl. No.: 623,739

[22] Filed: Jun. 22, 1984

[51] Int. Cl.$^4$ ............................................. G01K 9/34
[52] U.S. Cl. .......................................... 382/9; 382/30; 382/40
[58] Field of Search .................. 382/9, 30, 40, 48, 39, 382/34, 36, 61; 358/263

[56] References Cited

U.S. PATENT DOCUMENTS

| | | | |
|---|---|---|---|
| 3,995,254 | 11/1976 | Rosenbaum | 382/57 |
| 4,010,445 | 3/1977 | Hoshino | 382/57 |
| 4,058,795 | 11/1977 | Balm | 382/40 |
| 4,484,348 | 11/1984 | Shizuno | 382/34 |
| 4,516,262 | 5/1985 | Sakurai | 382/36 |
| 4,550,436 | 10/1985 | Freeman et al. | 382/34 |
| 4,556,951 | 12/1985 | Dickman et al. | 382/40 |
| 4,556,985 | 12/1985 | Hongo | 382/34 |

OTHER PUBLICATIONS

IBM Technical Disclosure Bulletin, vol. 24, No. 3, Aug. 1981, pp. 1588–1589, "Font-Independent Character Recognition by Cryptanalysis", Bahl et al.

IEEE Transactions on Computers, C-23, No. 11, Nov. 1974, pp. 1174–1179, "A Means for Achieving a High Degree of Compaction on Scan-Digitized Printed Text", Ascher et al.

Abstract of talk at International Symposium of Information Theory, "An Algorithm for Solving Simple Substitution Ciphers", Ronneby, Sweden, Jun. 1976, Bahl.

*Primary Examiner*—Anthony V. Ciarlante
*Attorney, Agent, or Firm*—Caesar, Rivise, Bernstein & Cohen, Ltd.

[57] ABSTRACT

A system for recognizing the content of a communication in symbolic language and composed of plural glyphs arranged in a predetermined order, each glyph being the smallest (lowest) informational unit of the language. The system includes a device for inputting a stream of data indicative of the plural glyphs, such as formed in a page of text. That stream is input into a storage means. The stored data is horizontally segmented into discrete lines of text and is then vertically segmented into individual glyphs. Each individual glyph is assigned a unique identifier, whereby all substantially identical glyphs are represented by the same identifier. The identifiers are arranged in a sequence corresponding to the sequence in which the glyphs appeared in the communication, thus representing glyph "words". The system then applies decryption routines which include general cryptographic techniques to the identifiers, their sequences and their interrelationships to determine the equivalent symbol of language corresponding to each identifier. Once the symbol of language corresponding to each identifier has been determined, the machine code equivalent (i.e., code capable of being "understood" and utilized by an electronic computer) is substituted for each identifier, so as to provide a machine readable code representation of the communication, e.g., page of text.

49 Claims, 22 Drawing Figures

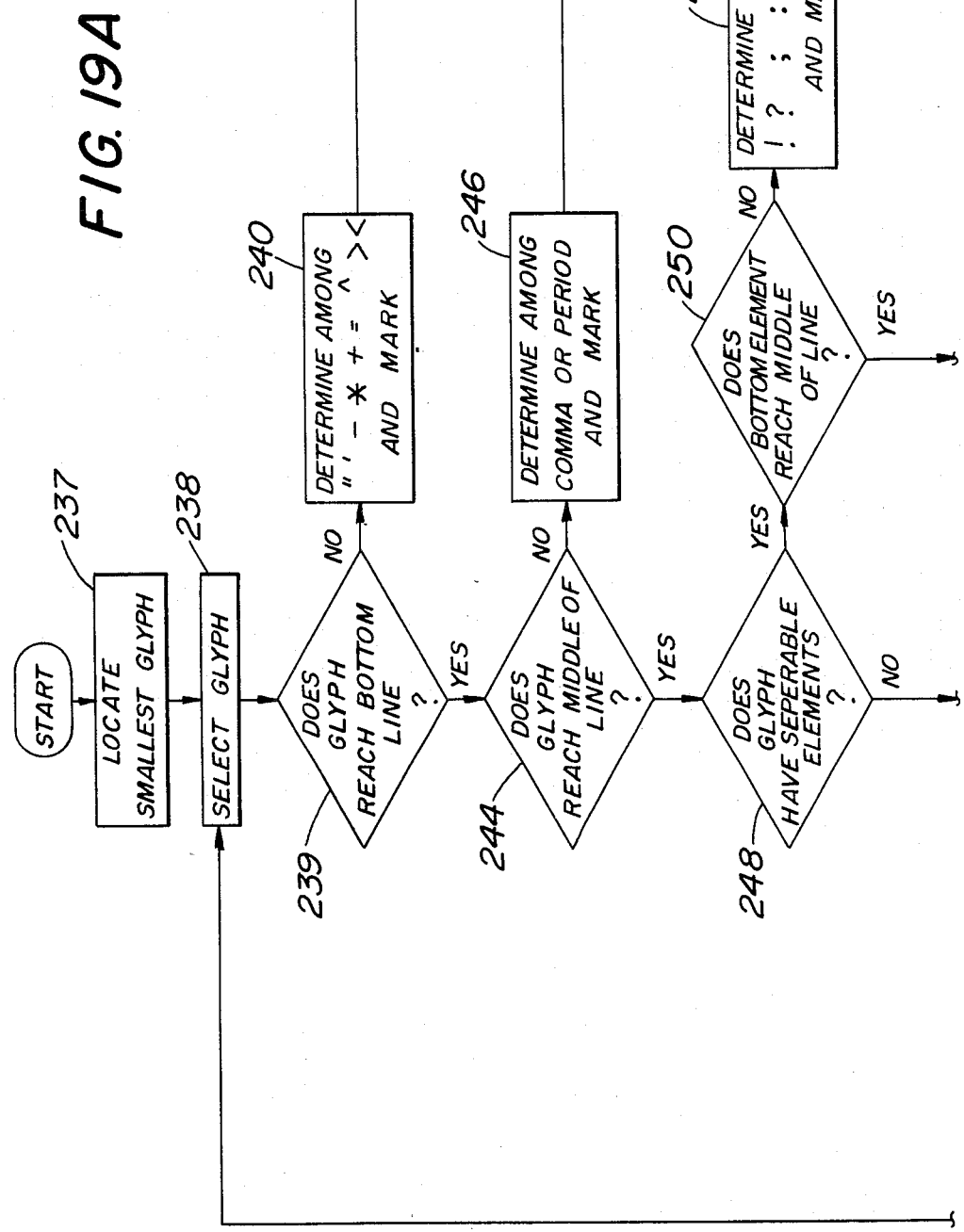

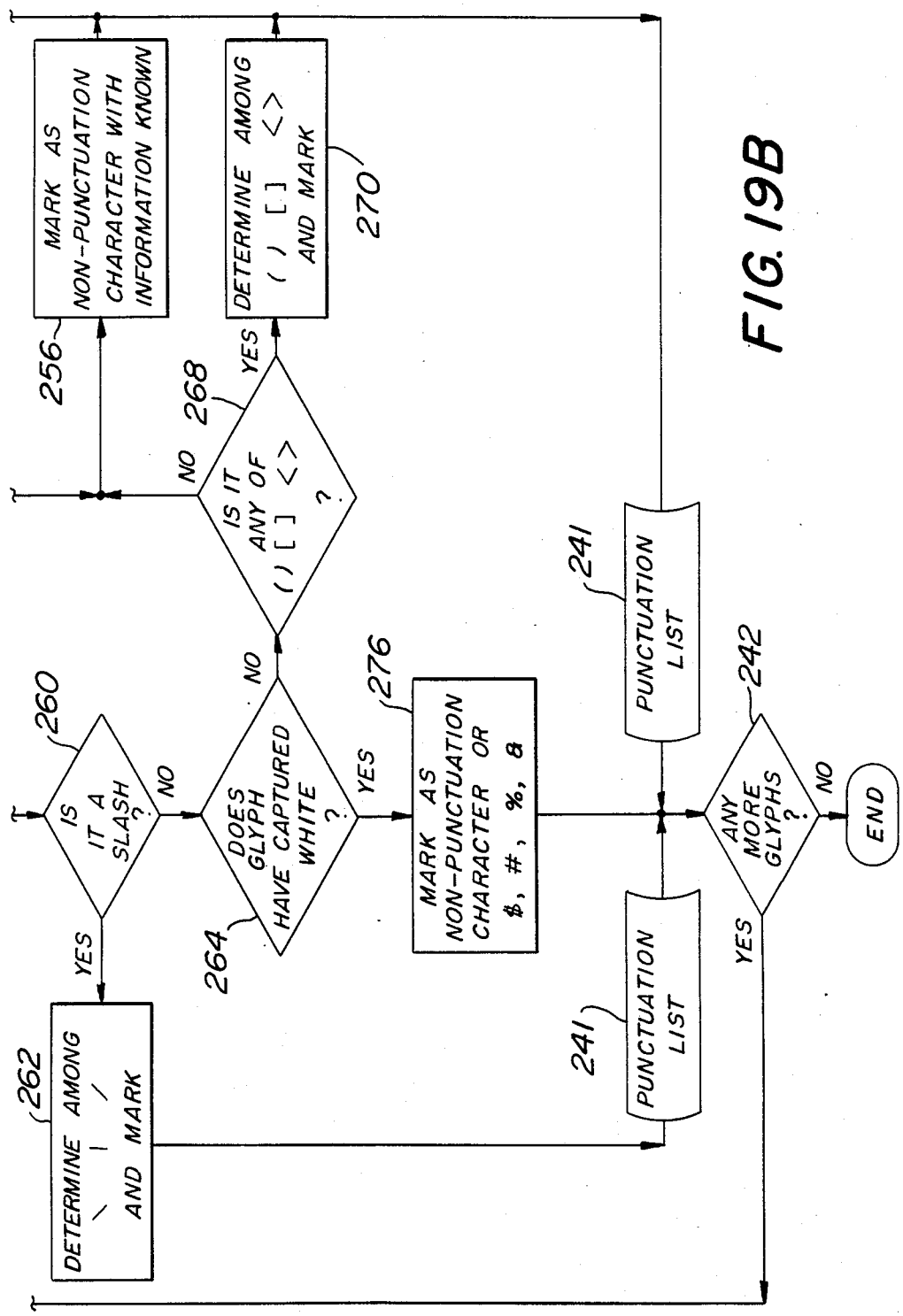

CRYPTOGRAPHIC ANALYSIS SYSTEM

BACKGROUND OF THE INVENTION

This invention relates generally to character recognition systems and more particularly to computerized character or text recognition systems.

In the prior art there is disclosed a wide variety of different types of character, image and/or pattern recognition systems, designed to read and convert pages of printed (e.g., typewritten) material into machine readable code, i.e., code capable of being "understood" or "read" by an electronic computer. These systems have become increasingly prevalent and important as input devices for use with modern computer-based systems, inasmuch as they enable pages of text to be quickly and efficiently entered into a computer's data base without requiring the time consuming and expensive process of having a keypunch operator retype the entire document on computer readable punch cards or alternatively, type the information directly into the computer through the use of an input terminal.

Although prior art character recognition systems are generally satisfactory for their intended purpose, a major limitation inherent in such systems stems from the fact that they generally utilize character masking (e.g., shape analysis) techniques to convert typewritten or printed characters into a machine readable code. The prior art systems are thus not well adapted for reading multi-styled character fonts, misprinted or misaligned characters, linked or joined characters (e.g., ligatures) and documents typed in proportional spacing, e.g., as is typically done by word processing equipment. Moreover, these prior art devices, which are designed to read only a single or a very few predetermined kinds of type fonts, are incapable of reading other type fonts for which the system is unfamiliar. Thus, these prior art systems do not have general applicability, since there are very many different kinds of type fonts in common usage.

It should also be mentioned that although the prior art character recognition systems generally do not utilize contextual information, e.g., cryptographic techniques, to identify particular characters (number or letters) being read, several prior art "spelling-checkers" and/or character recognition devices use contextual information to a limited degree to verify whether a word apparently misspelled or misprinted should be changed in view of certain information obtained from the context in which the word appears.

In that regard, in U.S. Pat. No. 4,058,795 (Balm), there is disclosed a context-aided recognition system. Although the Balm system is designed to identify an unknown character or characters by utilizing certain types of contextual information obtained by analyzing characters on the page, the successful operation of the Balm system requires that the vast majority of the characters on the page and in particular, those adjacent the unknown character or characters, be known, i.e., have been correctly determined through the use of conventional shape analysis techniques. In particular, the Balm patent system uses conventional character recognition techniques in the first instance to determine the identity of the vast majority of the characters on the page and it is only after the recognition of most of the characters that contextual techniques are used to complete the identification process. Thus, the contextual analysis as disclosed and utilized in the Balm system is the very specific and limited type of "N-gram" analysis. As is known N-gram analysis is a type of analysis which is only suitable for use once a large number of characters have already been correctly identified. Thus, in the Balm system the analysis is a deductive process in the sense that it used contextual information obtained from adjacent characters to deduce the identity of a single unknown or misrepresented character. Moreover, such action is done without producing a generalized definition enabling all glyphs (symbols of language) of a particular shape, wherever they might appear on the page, to be recognized as being that of a given character (letter or number). Contrasted thereto, the system as disclosed and claimed herein involves an inductive process in the sense that contextual analysis techniques are used not primarily for purposes of decrypting any particular unknown word or letter, but rather are used to build a "construct" capable of identifying all similarly shaped glyphs, wherever they might appear on the page, as being that of a particular character. Thus, the cryptographic techniques as used and disclosed herein, produce generalized solutions used for identifying unknown glyphs.

Other prior art systems are disclosed in U.S. Pat. Nos. 4,010,445 (Hoshino) and 3,995,254 (Rosenbaum). These systems relate to what can generally be referred to as spelling checkers or word verification systems, used for correcting misspelled or incorrectly recognized letters. Although these systems and others disclosed in the prior art use a dictionary "look-up" process to compare input words with a dictionary list to determine whether certain words are in actuality, misspelled versions of words appearing in the dictionary, these systems do not utilize generalized contextual information and further, do not use such information in the first instance for primary analysis. Thus, these prior art systems only use some contextual information to a limited degree where the vast majority of the text (i.e., the entire text but for an occasional incorrect character) has been decoded using conventional character recognition techniques, e.g., shape analysis.

To summarize, the prior art systems, although generally suitable for their intended purpose, e.g., spelling checkers, etc., are not at all suitable for being used as a text recognition system capable of recognizing characters or glyphs appearing in a wide variety of different kinds of type fonts in a wide variety of document types, e.g., books, business letters, financial reports, etc.

OBJECTS OF THE INVENTION

Accordingly, it is a general object of the instant invention to provide a text recognition system which overcomes the deficiencies in the prior art.

It is another object of this invention to provide a system and method which utilizes linguistic, format and character pattern cryptanalysis techniques to convert glyphs or characters found in natural language text, be it written or spoken, and carried by an information stream, into machine readable form.

It is another object of the instant invention to provide a text recognition system which utilizes contextual patterns and interrelationships among glyph letters and numbers to decode and convert a page of textual information into machine readable form.

It is a further object of the instant invention to provide a text recognition system capable of using cryptanalytic techniques to identify and convert symbols of language into their machine code equivalents.

It is still a further object of the instant invention to provide a text recognition system capable of recognizing and converting textual material into its machine code equivalent, irrespective of the particular type font(s) and the size(s) thereof in which the material appears.

It is still a further object of the instant invention to provide a text recognition system capable of segmentation or isolating individual glyph elements from a page of text, to permit further analysis and identification of those glyph elements to be performed.

It is still a further object of the instant invention to provide a text recognition system which employs cryptographic techniques, to identify and convert natural language text into its machine code equivalent.

It is still a further object of the instant invention to provide a character recognition system which may readily be used in combination with conventional microprocessor based computational systems and conventional input devices, e.g., facsimile machines, to quickly and efficiently convert a page of text into its machine code equivalent, without requiring substantial human interaction.

Other objects and many of the attendant advantages of this invention will be readily appreciated as the same becomes better understood by reference to the following detailed description when considered in connection with the accompanying drawing wherein:

SUMMARY OF THE INVENTION

A system for recognizing the content of a communication in symbolic language, said communication being formed of a plurality of glyphs arranged in a predetermined order. Each glyph is a discrete element generally comprising the smallest (lowest) meaningful informational unit of the language. The system includes sensory input means for sensing a plurality of glyphs and then inputting a stream of data indicative thereof into storage means. The system also includes separating means which separates the symbolic language data into a plurality of glyphs. Compiling means are provided to assign a unique identifier to each set of substantially identical glyphs. Pattern grouping means are provided to arrange the identifiers in an arrangement corresponding to the arrangement of said glyphs in said communication. The system also includes decryption means which applies general cryptographic techniques to the identifiers, their sequences and their interrelationships, to determine the equivalent symbol of language corresponding to each identifier. By determining the corresponding symbol of language for each identifier, the symbolic language may readily be represented in machine code, so as to be capable of being fully utilized by an electronic computer.

DESCRIPTION OF THE DRAWING

FIGS. 19A and 19B together comprise a flow chart showing the means used for identifying and decoding punctuation.

DETAILED DESCRIPTION OF THE PREFERRED EMBODIMENT

Figure 1:
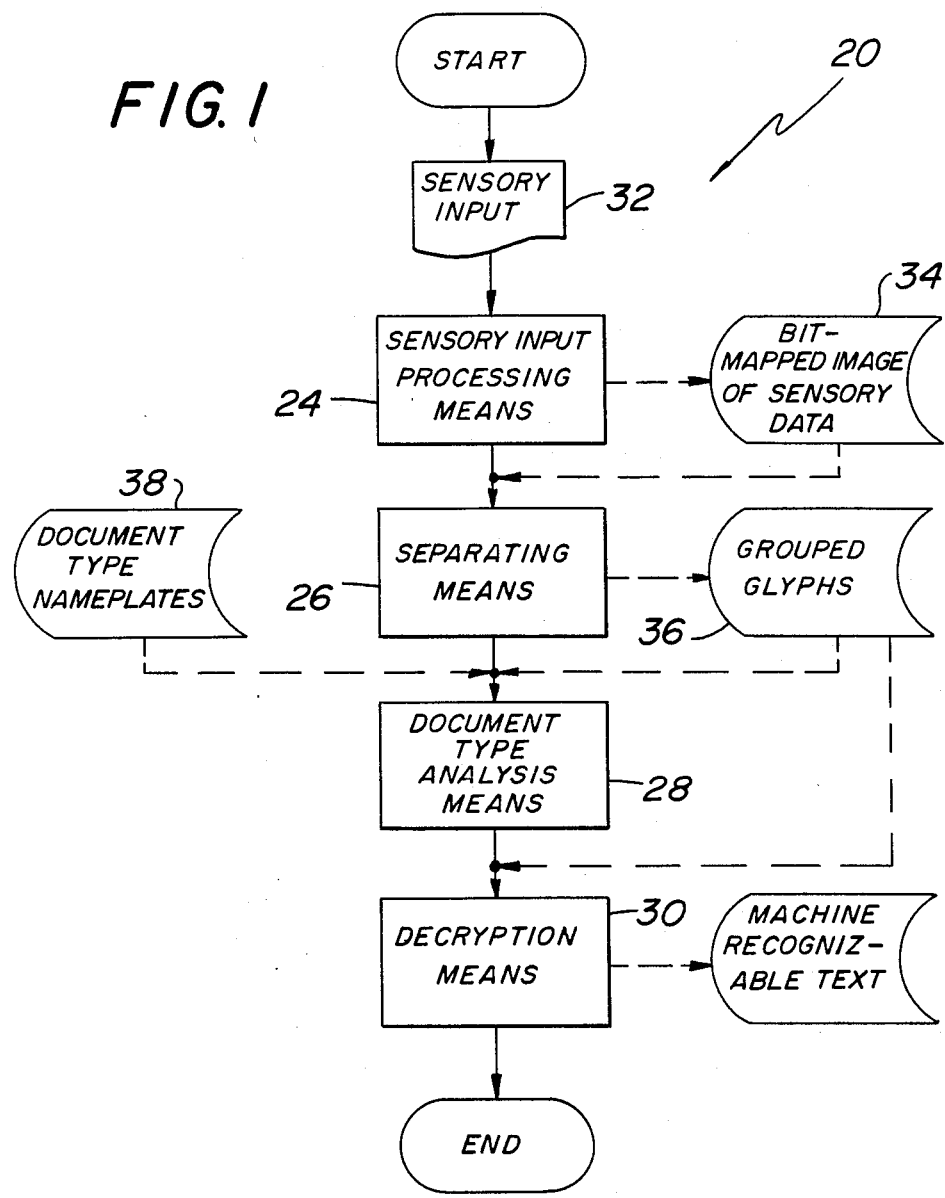
FIG. 1 is a block diagram/flow chart showing the various components comprising the cryptographic analysis system of the instant invention and the functional interrelationship therebetween.

Referring now in greater detail to the various figures of the drawing wherein like reference characters refer to like parts, there is shown at 20 in FIG. 1 a cryptographic communication analysis system constructed in accordance with the teachings of the instant invention. The system 20 is designed to recognize the content of a communication in a symbolic language, where the communication comprises a plurality of glyphs arranged in a predetermined order and with said glyphs being the smallest (lowest) informational unit of the language. In the embodiment described in detail hereinafter the communication comprises a document, i.e., any medium carrying visually perceptible glyphs of a symbolic language. As will be seen hereinafter the system 20 is particularly constructed and arranged to "read", e.g., convert, typewritten or printed text into machine readable form. By machine readable form, it is meant characters, numbers, punctuation or other symbols of language which can be "read" or "understood" by an electronic computer. In this regard, the machine readable text produced by the system 20 may readily be manipulated and utilized by an electronic computer in precisely the same manner as information entered directly into the computer through the use of conventional means, e.g., keyboard or card reader.

The system 20, in addition to recognizing or processing textual information produced on a standard typewriter having a particular type font, is also capable of recognizing an unlimited number of different kinds of type fonts and their sizes, whether produced on a typewriter, word processing equipment or on other hard copy producing device, such as a printing press.

Moreover, it should be pointed out that although the preferred embodiment of this invention, as disclosed herein, relates to a system for reading and converting printed or typewritten textual material in a document into machine readable form, the system may readily be adapted to recognize and convert spoken language into machine readable form, as well. Suffice it to state, that such a voice recognition system utilizes linguistic, format and other contextual information and techniques in combination with conventional recognition schemes to convert the sound patterns into their machine code equivalents.

Now referring to the various flow charts, as shown in the various figures of the drawing, it should be realized that the function performed by each of the functional or decision blocks shown in those flow charts can be effected by hardware, e.g., logic circuitry, or alternatively, by appropriate software run in a general purpose computer or some other programmed or programmable means. Owing to such alternative implementations of the subject invention and in the interest of simplicity of explanation, each functional unit is referred to hereinafter as a "block" and the function performed by each functional unit is graphically represented in the drawing by the block bearing the legend descriptive of the function performed by that block.

Now referring to FIG. 1, the cryptographic recognition system 20 of the instant invention basically comprises sensory processing means 24, separating means 26, document type analysis means 28 and decryption means 30.

The sensory processing means 24 is a conventional device and will be described later. Suffice it to say for now that the means 24 is arranged to take a page 32 of a document to be processed, e.g., a typewritten page of text and to produce a digitized bit-mapped representation of that page. The digitized bit-mapped representation of the page of text is merely a binary matrix representation of the physical locations on the page which are dark, i.e., contain printed matter, and those which are light, i.e., do not contain printed matter. The bit-mapped representation of the print appearing on the page 32 is then transmitted from the sensory processing means 24 to the separating means 26. The separating means 26 (as shall be described in much greater detail later) divides or segregates the bit-mapped representation of the page or document into a plurality of discrete "glyphs" and groups of glyphs (glyph words) 36.

The term "glyph" as used in this application shall refer to any symbol of language which is capable of being recognized and decoded using the means and techniques of the invention and the term "glyph words" as used herein shall refer to groups of glyph characters corresponding to words of language. In that regard, in FIG. 9 there is shown at 33 the bit-mapped representation of a typical glyph, corresponding to the lowercase letter "a".

As shall be described in much greater detail later, the separating means 26 also measures and analyzes the height of the respective lines of text, the width of individual glyph elements and the spacing between groups of glyph elements, i.e., the spacing between glyph words, for further analysis. Once the text has been separated into discrete glyph elements and glyph words, the document-type analysis means 28 utilizes information 36 relating to the location and groupings of the glyphs and glyph words on the page, in order to classify the page as being that of a particular type of document, e.g., a balance sheet, a business letter, etc. To accomplish that end the document type analysis means 28 is provided with document type nameplate 38 and with output information from the separating means 26. As shall be described later, the document type information serves to facilitate the process whereby the decryption means 30 identifies and converts individual glyphs into machine readable code.

The decryption means 30 then analyzes glyphs and groups of glyphs in terms of various contextual (e.g., grammatical, syntactical, idiomatic, etc.) patterns or style (e.g., amount of paragraph tabulation, paragraph spacing, etc.) patterns and interrelationships among the individual glyphs and groups of glyphs, to determine the particular letter, number or other symbol of language corresponding to each particular glyph. In this regard, once the particular symbols of language corresponding to the respective glyphs have been determined, the text may readily be represented in machine recognizable code, by utilizing a simple substitution process. Suffice it for now to state that the decryption means employs various cryptanalytic computational linguistic techniques, (some of said techniques are generally associated with the solving of word puzzles (cryptograms), number puzzles (cryptarithms) and the like), to determine the letter or other symbol of language corresponding to each particular glyph. Since these techniques do not depend upon the geometry or shape of the particular glyphs, the system is capable of decoding a page of textual information, irrespective of its type font or size (both horizontally and vertically).

The cryptanlytic (cryptographic), computational, linguistic techniques of the system 20 serve to analyze, recognize and decode text bearing information streams based upon the contextual pattern structures common in all and to each specific natural written or spoken languages. The redundancy of any natural language limits the number of permutations and combinations of its alphabet that are employed to construct valid words or word phrases, and also limits the number of words that are employed to construct the majority of any written or spoken message or communication. For example, the glyph or letter representing "e" occurs 13% of the time in any English language word. Likewise, in French or German, the glyph or letter "e" occurs at an 18% frequency probability; and in Spanish or Italian also at a 13% frequency probability. Such frequency probabilities exist for glyphs in other languages, and for multi-character glyphs in all languages.

Text information streams are cryptanalyzed by system 20, and glyph characters or glyph character strings recognized and converted into machine code using modules based on tables designating the frequency or probability of occurrences for such contextual attributes. Taxonomical and statistical tables on the usage frequency, placement and sequence probabilities of glyph characters, multi-character group glyphs or ligatures, words, phrases or other character string text elements and which are derived from the rules of the language, such as its syntax, grammar, spelling and punctuation are applied by the system 20 to the analysis and recognition of the text contained in any natural language information stream. For example, the frequency of occurrence of a glyph letter or alphabetic character within a 100-character block of English text shows that the letter "e" occurs on average about 13 times. A table, such as shown in Table 1.1 herein, derived from such statistics shows that about 13% of all letter characters within any text block would be an "e"; about 9% a "t"; 8% an "a" or "o"; 7% an "n", "i" or "r"; 6% an "h"; 4% an "l" or "d"; 3% a "c", "u", "p" or "f"; 2% an "m", "w" or "y"; 1% a "b", "g" or "v"; and even smaller percentages for a "k", "q", "x", "j" and "z".

The tables of the system 20 are also derived from the frequency of occurrences or non-occurrences of the following contextual attributes: common contiguous two-character diagraphs, three-character trigraphs, four-character quadrigraphs, etc., glyph character, linked character glyph or ligature letter groupings found at the beginning, the end, or within text words. For example, English common word beginnings include the digraph glyphs "an-", "at-", "be-", "de-", "dr-", "en-", "in-", "no-", "re-", "se-", "th-" and "un-"; and the trigraph glyphs "pre-" and "pro-". Common words endings include the digraph glyphs "-ed", "-en", "-er", "-es", "-is", and "-ll"; the trigraph glyphs "-ant", "-ate", "-ble", "-bly", "-ded", "-ere", "-ese", "-est", "-ess", "-ful", "-ght", "-ine", "-ing", "-ion", "-ist", "-ive", "-lly", "-ous", "-rst", "-ses", and "-sts"; and the quadrigraph glyphs "-ance", "-ment", and "-tion". Similar vowel-vowel, vowel-consonant and consonant-consonant, contiguous multi-character glyph relationships also exist. An "a", "i", "u" or "y" seldom form doublet glyphs like "aa", "ii", etc., whereas an "e" and "o" doublet frequently to form "ee" or "oo" glyphs. An "l", "r", "s", "t", "c", "f", "g", "m" or "p" form doublet glyphs frequently, but a "j" never doubles. A "q" almost always forms a doublet with "u", and "z" with vowels on either side. For punctuation, an "'" frequently forms doublets with "s", "t" or "d" or a triplet with "ll". And for financial statement numerics and symbols, a "$" very rarely will doublet with "0" (zero) to form the glyph "$0", but a decimal point "." and "0" (zero) will frequently form the triplet glyph ".00".

The system 20 further includes tables which are derived from the frequency of occurrences, or non-occurrences for the following other contextual attributes: Common character occurrences in word glyphs, or non-contiguous but repetitive character, glyph or ligature, dual occurrences (dicurrence), triple occurrences (tricurrence), quadruple occurrences (quadricurrence), etc., and digrams, trigrams, etc., within words. For example, a three-character word glyph with "h" as the central character is most frequently "the"; with "n", most frequently "and"; and with "r", most frequently "are". Similar glyph linkage probabilities coupling known glyphs with the contextual glyph sequence referred to above further define suffix or prefix, and word occurrence probabilities.

For polysyllabic word glyphs, non-contiguous but repetitive character or glyph occurrences are employed to further define word probabilities.

The system's tables also make use of common single-character, two-character, three-character, four-character, etc., words. For example, common single-letter glyph words are "a" and upper case "I"; common two-character glyph words are "an", "as", "at", "be", "by", "do", "go", "in", "is", "it", "no", "me", "my", "of", "on", "or", "so" and "to"; common three-character glyph words are "and", "any", "are", "but", "did", "for", "get", "has", "his", "her", "man", "may", "nor", "not", "one", "our", "out", "say", "see", "the", "try", "was", "way", "why" and "you"; common four-character glyph words are "easy", "from", "full", "into", "once", "only", "over", "have", "that", "this", "upon", "what", "will" and "your". Overall, only 10 words ("the", "of", "and", "to", "a", "in", "that", "it", "is" and upper case "I") constitute 25% of any English text message, and only 850 words constitute a basic English vocabulary.

Common two-word, three-word, etc., phrases or word groups are also made use of in the system's tables. For example, a three-character word glyph following any word glyph ending with a "," (comma) is probably "and", "but" or "for". Three-word date glyphs within messages follow month-day-year or day-year-month conventions such as "January 10, 1983", "Jan 10, 1983", "10 January 1983" or "10 Jan 1983". Formal greetings beginning with "Dear" are coupled with titles such as "Mr.", "Dr.", "Professor", etc. Formal endings are most frequently "Very truly," or "Very truly yours,", "Sincerely," or "Sincerely yours,", "Best regards," or "With best regards,".

Similar frequency probabilities as those described heretofore also exist in French, German, Japanese or other foreign languages. Likewise, within any language, profession based technical, medical, legal, financial, etc., literary styles and their related lexicons also have their own frequency probabilities as special subsets to general usage language.

Common syntax, punctuation and capitalization order relationships within the text for identifying the positions of articles, nouns, proper nouns, prepositions, adjectives, verbs and adverbs, and their associated phrases, are also used by the system 20.

Another cryptanalytic computational technique used by system 20 constitutes a format pattern technique which analyzes, recognizes and decodes text bearing information streams based upon the geographic formats common to most formal text messages or communications. Taxonomical tables on message type; on the placement or position of word, numeric, or word and numeric fields within the message; and on the placement or position of words within sentences, phrases or titles are derived from the common formats used in the composition correspondence, financial statements, legal documents, invoices, purchase orders, credit cards, or other formatted text. Such tables are incorporated into the system and are used for the cryptanalytic computational analysis and recognition of text message formats and format fields. For example, the placement of date, address, greeting and closing fields in correspondence follows certain usage conventions. Such fields may be recognized by their cryptarithmic positions within the text information stream. Likewise, financial statements follow similar conventions in the placement of alphabetic field and sub-field labels to the left of their related numeric fields, and of numeric sub-totals and totals at certain defined locations within the numeric fields. Similar geographic cryptarithm format patterns exist in other type messages.

As will be seen later, once the message type and related row or column fields and sub-fields have been recognized by geographic cryptarithm pattern analysis techniques, contextual and graphalogical analysis techniques are then utilized to recognize the individual characters, character glyphs or ligatures, words or phrases within the fields. Special message format related contextual and graphological table analyzer and decoder modules are used in such instances to effect the final text recognition and conversion of specific fields and subfields within the message format.

For example, when the message format has been recognized as a balance sheet, a subset lexicon of words, terms and phrases related to financial statement terminology is utilized in the contextual analysis tables. The field labels of "Assets" and "Liabilities" or "Liabilities and Stockholders' Equity" are immediately recognized by their geographic placement. Sub-field labels of "Current Assets", "Current Liabilities", "Long-Term Debt", "Stockholders' Equity", etc., are also recognized using both format position and contextual analysis routines. Numeric fields and sub-fields within the balance sheet can likewise be analyzed by contextual techniques to recognize numeric characters.

It should be mentioned at this point, however, that in addition to the cryptographic techniques, the decryption means also uses, at least to a limited degree, shape analysis techniques to provide some additional information which may be useful under certain circumstances, thus augmenting the decryption process. However, the shape analysis techniques, when used, are used primarily for purposes of identifying punctuation and to a lesser degree for identifying numbers where there is an inadequate supply of numbers available on the page to effectively decode the numbers using the cryptarithm techniques. With respect to identifying letters, it should be mentioned that shape analysis techniques are generally neither used nor required.

The sensory processing means 24, as mentioned above, converts the page of text 32 into a bit-mapped representation thereof. In particular, in the preferred embodiment of the invention, a bit-mapped representation of the page of text is obtained by using a conventional facsimile device as the sensory processing means 24. The facsimile device 24 provides a digitized representation of the document, which is then transmitted by suitable interfacing means (not shown) to either a general purpose computer having appropriate software constructed in accordance with this invention therein or to logic circuitry designed in accordance with this invention to further process this information.

In the preferred embodiment of the invention, the facsimile device is a conventional device manufactured and sold by Xerox Company of Stamford, Conn. as model TC495-I. The system 20 of the subject invention uses the facsimile device's output and processes it, as will be described in considerable detail later, to provide an output through an RS-232 connector in standard ASCII format. It should further be noted that the acuity of the facsimile device is such, so as to represent a page of text in a matrix containing 200 pixels per inch, both across and up and down the page. However, it should be recognized that a wide variety of other types of devices may also be used to produce a digitized representation of a page of text, suitable for further processing by the system 20. To name a few examples, flying spot scanners, digitizing cameras and photo sensor matrices are among those devices which may be used or adapted for use with the computational or logic hardware of the instant invention, to serve as input means for providing a digitized representation of the page of text. The important requirement in this regard is that the scanning device provide a resolution necessary and sufficient to provide a discernably unique binary representation for each glyph corresponding to a unique symbol of language. Furthermore, it is necessary that the bit-mapped representation of the page of text be formed as scan lines whose respective ends are uniquely identifiable. As noted above, the bit-mapped representation of the page of text, as produced by the sensory input processing means 24, is then transmitted to the separating means 26, which breaks the bit-mapped representation of the page into a plurality of identifiable glyphs and groups of glyphs. The separating means 26 comprises a plurality of means which perform various steps towards "breaking" the bit-mapped representation of the page of text into a plurality of identifiable glyphs (e.g., glyph elements) and groups of glyphs (e.g., glyph words), each comprising one or several glyph elements.

Figures 2, 3:
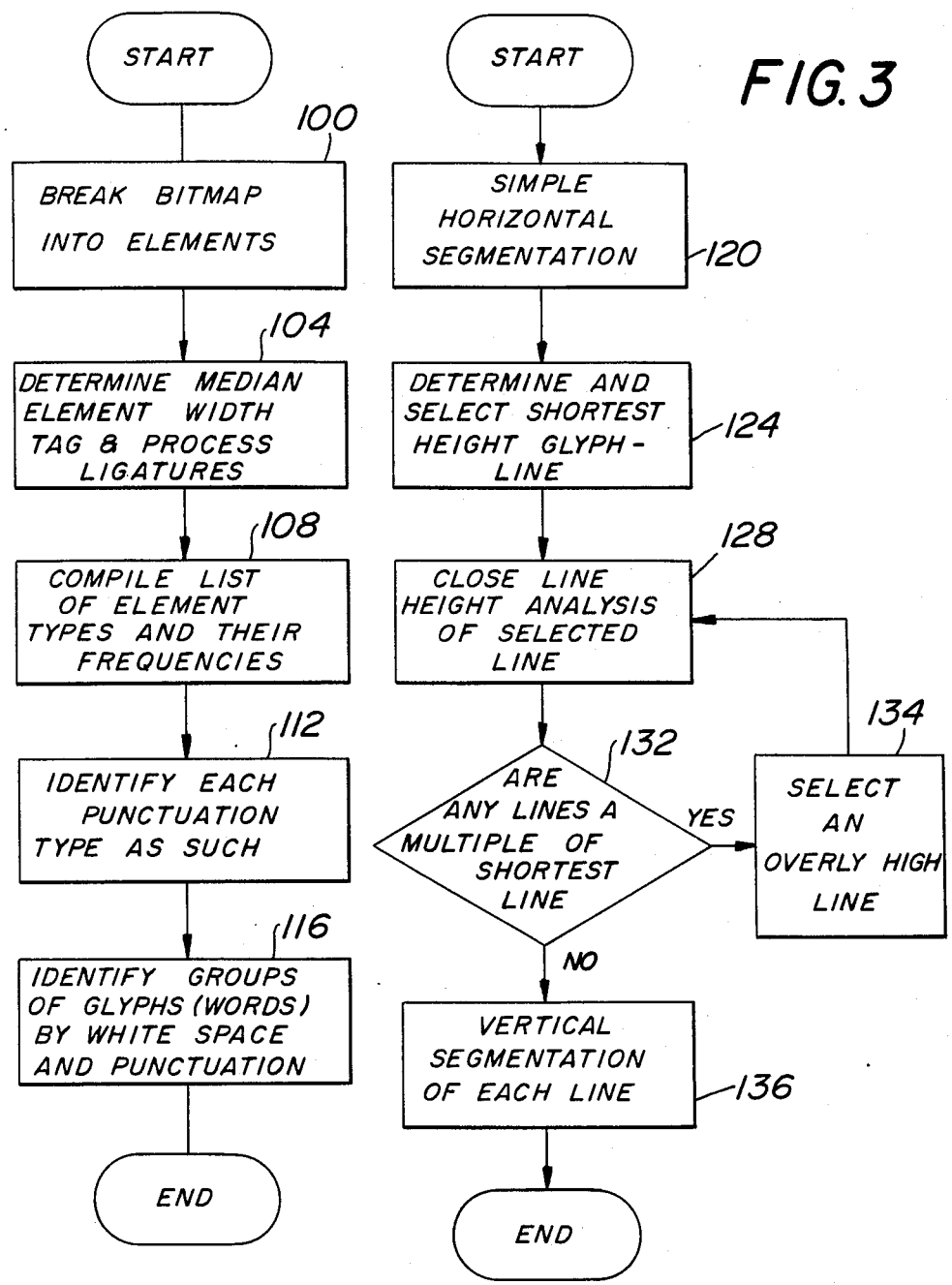
FIG. 2 is a flow chart showing the means for effecting the functions performed by the sensory input processing means shown in FIG. 1.
FIG. 3 is a flow chart showing the means for breaking a bit-mapped representation of an input page into discrete glyph elements for further processing.

Referring to FIG. 2, the separating means comprises "blocks" 100, 104, 108, 112 and 116. In that regard, block 100 breaks the bit-mapped representation of the page 32 into individual glyph elements. Block 104 both determines the average width of those glyph elements and identifies those glyphs which appear to be ligatures (i.e., several glyph elements physically interconnected). For example, some printing presses print the letters "w" and "h" as "Th" when appearing next to each other. Block 108 compiles a list of glyph element types and their respective frequencies (i.e., how many of each type there are in the page). Block 112 recognizes and identifies punctuation. Block 116 groups the glyph elements into glyph words by analyzing the amount of white space located between adjacent glyphs and by recognizing the fact that certain punctuation serve as boundaries between words.

The breaking of the bit-mapped representation of the page of text into discrete glyph elements, as performed by block 100, is generally shown in the flow chart of FIG. 3. In this regard, the block 100 basically comprises block 120 for performing what is referred to as "simple horizontal segmentation", block 124 for determining and selecting the shortest height glyph-line, block 128 for performing what is referred to as "close line height analysis of selected lines", block 132 for determining whether any of the glyph lines are a multiple of the height of the shortest glyph line, block 134 for selecting overly high lines, and block 136 for effecting what is referred to as "vertical segmentation".

Figure 4:
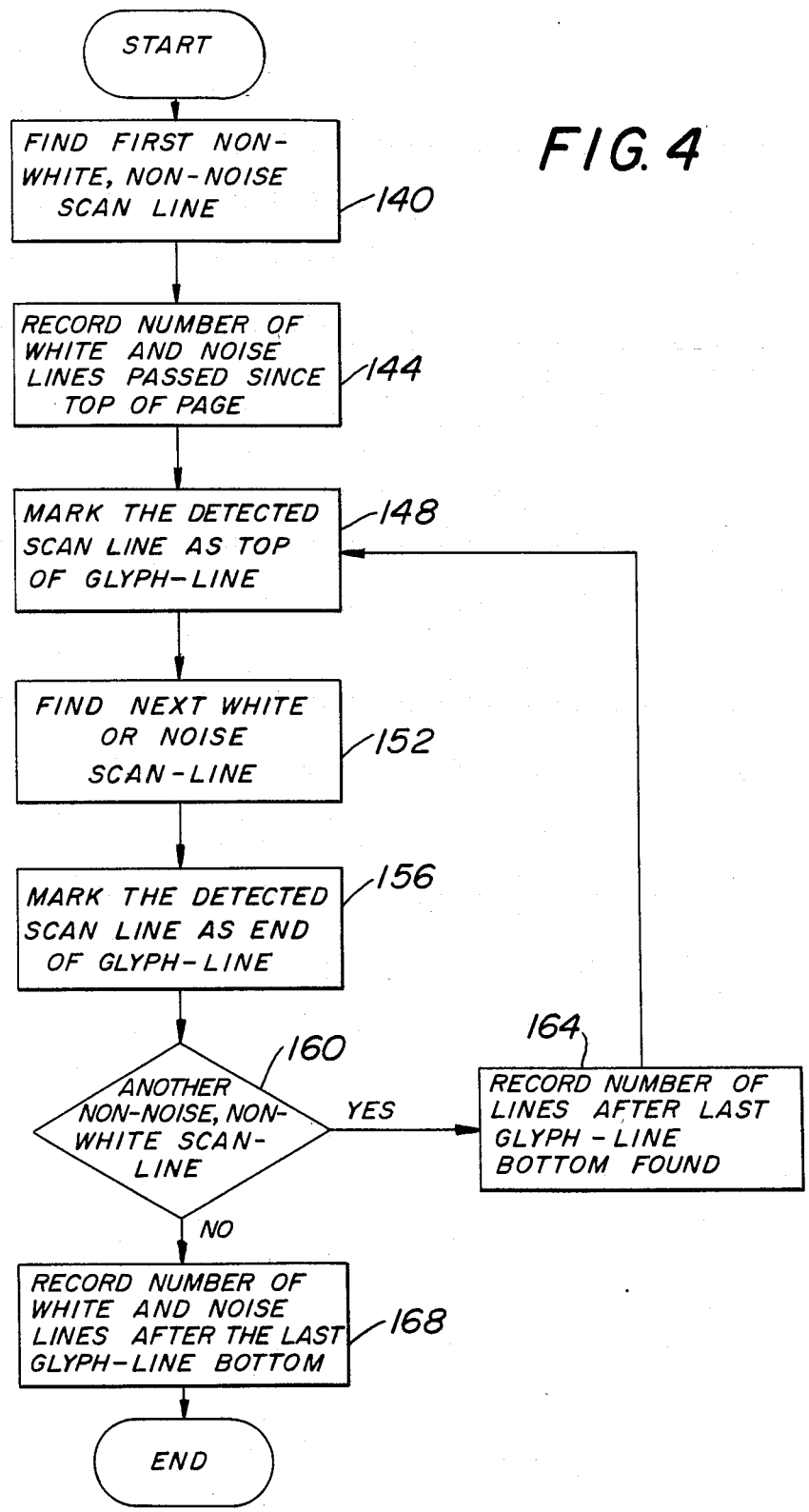
FIG. 4 is a flow chart showing the means for effecting simple horizontal segmentation of glyph elements.
Figure 9:
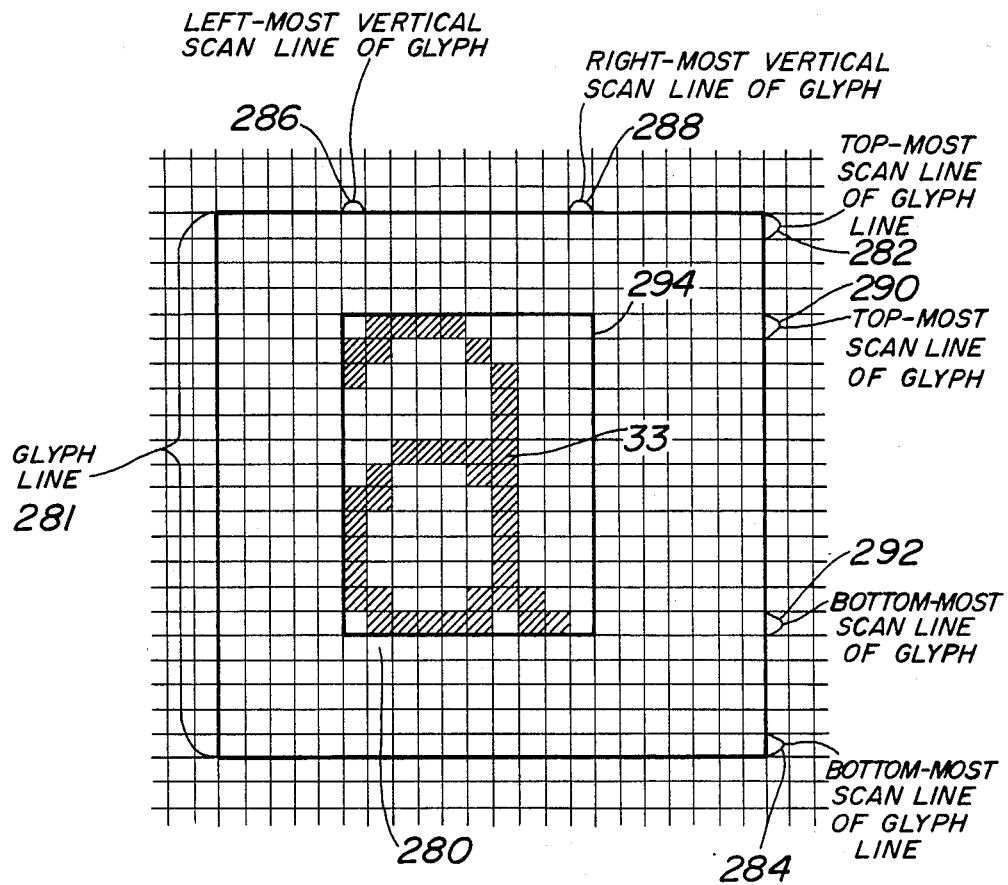
FIG. 9 is an illustration of a bit-mapped representation of a typical glyph.

Simple horizontal segmentation, as performed by block 120, entails the "breaking-up" of the bit-mapped image of the page of text, into a plurality of horizontal lines of text, i.e., glyph lines (FIG. 9). It should first be mentioned that simple horizontal segmentation is merely an initial or tentative determination as to the discrete lines of text. Therefore, this determination may eventually be modified based on further processing, as shall be described later. Thus, the process of simple horizontal segmentation is merely an attempt at quickly and easily dividing the page into horizontal lines of text. To that end, the specific operation for accomplishing simple horizontal segmentation is shown in the flow diagram of FIG. 4. As can be seen therein the first step towards effecting simple horizontal segmentation, is performed by block 140, and constitutes locating the first "non-white", "non-noise" horizontal scan line (FIG. 9) on the bit-mapped representation of the page 32. What is meant by a non-white and non-noise scan line, is the first horizontal scan line which intersects a sufficient representation of black pixels, e.g., printed material, excluding ambient marks or blemishes which are of a size smaller than three pixels high by three pixels wide. In order to determine the first non-white, non-noise scan line, block 140 sequentially analyzes the horizontal scan lines beginning at the top edge of the page and proceeding down towards the bottom edge of the page, until certain predetermined criteria are met regarding the number and/or placement of black elements or pixels along a scan line. The criteria used pertains to the percentage of black elements relative to white elements located along a line. This percentage is varied, as desired, to establish the desired level of sensitivity, based on the amount of "noise" appearing on the page.

Once the first non-white, non-noise scan line on the page has been located, the number of white or noise scan lines which had been passed before encountering the first non-white/non-noise scan line is recorded for later use by block 144. The block 148 then identifies the first scan line encountering non-white, non-noise material, as being the first, e.g., top, scan line of the first glyph line. The scanning process is continued by proceeding down the page until a white or noise scan line is encountered. This action is accomplished by block 152. The white or noise line immediately following a non-noise/non-white scan lines is recognized and recorded as being the last scan line of the glyph line. Block 156 thus marks this first noise or white scan line as being the bottom scan line of the glyph line. A decision block 160 then determines whether there is another non-noise/non-white scan line on the page.

If a determination is made by block 160 that there is another non-noise/non-white scan line further down the page, this information is provided to block 164. This block serves to record the number of lines separating the bottom scan line of the previous glyph line and the next non-noise/non-white scan line. Block 164 also records the number of white or noise lines separating the respective glyph lines. At this point, the procedure described above is repeated, as block 164 provides this information back to block 148, thus establishing a loop. Block 148 then marks the detected non-noise/non-white scan line as being the top scan line of the next glyph line, block 152 locates the next white or noise scan line, block 156 marks or recognizes the next white or noise scan line as being the bottom scan line of the glyph line and block 160 again determines whether there are any other non-white/non-noise scan lines. The above described loop continues until such time that decision block 160 determines that there are no other non-noise/non-white scan lines on the page. Upon making such a determination, block 160 provides this information to block 168. Block 168 then records for later use, the number of white or noise lines separating the bottom scan line of the bottom most glyph line and the bottom edge of the page. At this point, simple horizontal segmentation is complete.

The next step towards breaking the bit-mapped representation of the page of text into discrete elements is to determine and select the shortest height glyph line. This action is performed by block 124. As can be seen in FIG. 3, block 124 determines the height of each glyph line identified by block 120 during simple horizontal segmentation. In this regard, the height of a glyph line is measured in terms of the number of horizontal scan lines separating the uppermost and lowermost scan lines of the glyph line. The shortest glyph line, e.g., the glyph line containing the fewest number of horizontal scan lines, is then selected by block 124 for further processing. If several of the glyph lines have equally few scan lines, one of those glyph lines is selected based on some random criteria, e.g., which line is closest to the top of the page.

Figure 5:
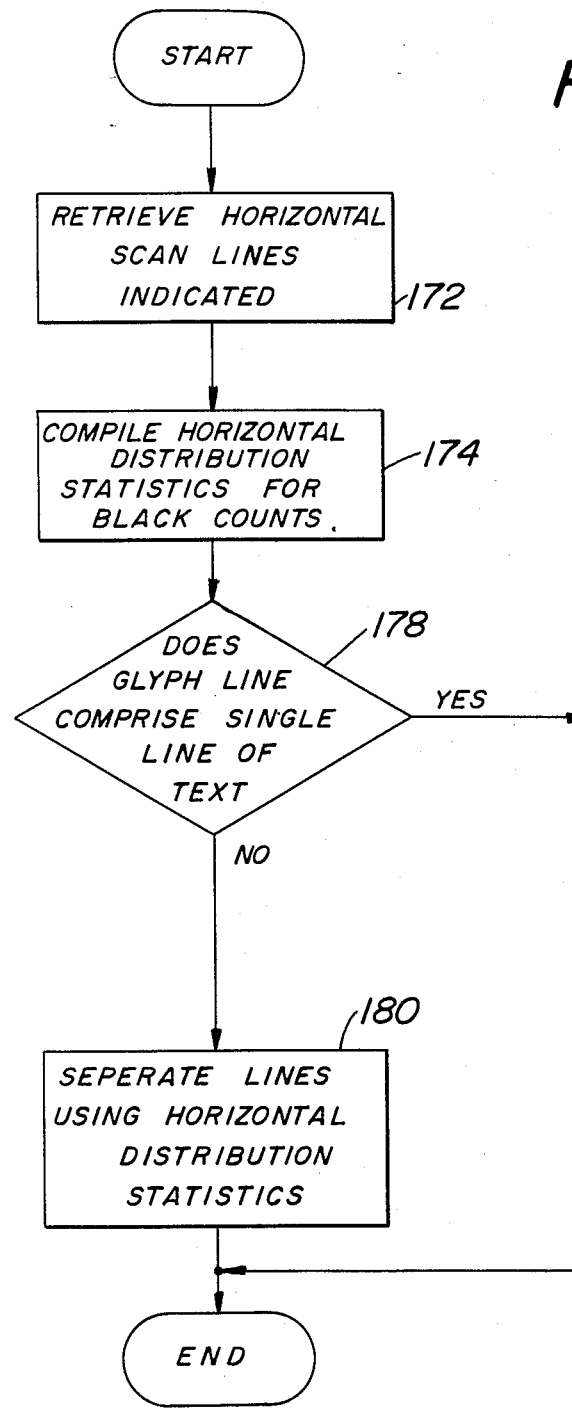
FIG. 5 is a flow chart showing the means for performing close line height analysis of selected lines of text.

The next step in breaking the bit-mapped image into individual elements is performed by block 128. Block 128 performs what is referred to as "close line height analysis on selected lines". In this regard, close line height analysis, as performed by block 128, determines whether the glyph line selected by block 124, i.e., the shortest glyph line, contains only a single line of text. If block 128 determines that the selected line contains more than a single line of text, block 128 divides or breaks the selected line into its component lines. The means for performing close line height analysis is shown in greater detail in FIG. 5. Thus, as can be seen the first step in the process of performing close line height analysis is performed by block 172. In particular, block 172 retrieves for further examination, all of the horizontal scan lines comprising the selected glyph line. Block 174 counts and records the number of black pixels contained in each of these selected horizontal scan lines. In this regard, if the glyph line is indeed only a single line of text, the black pixel count will be greatest along the middle scan lines where both the main body of the lower case letters and the lower half of the upper case letters lie. A lower count of black pixels should thus occur along the scan lines adjacent the upper portion of the glyph line where only lower case ascenders (the portions of lower case letters which ascend above the normal top edge of lower case letters) and the top half of the upper case letters lie. Moreover, an even lower count of black pixels should occur along scan lines adjacent the bottom of the glyph line, where only the lower case descenders lie. Therefore, if the glyph line is in fact more than a single line of text, there will be present two or more maximum concentrations of black pixels which are separated by a minimum concentration area(s). Such situations tend to occur where adjacent lines of text are not sufficiently spaced from each other to provide for a generally all white horizontal scan line(s) between the lines of text.

Once the horizontal distribution statistics have been compiled by block 174, these statistics are provided to decision block 178. Decision block 178 then analyzes the horizontal distribution statistics to determine whether the selected glyph line comprises more than one line of text. To that end, if the horizontal distribution statistics, as compiled by block 174, indicate that the glyph line includes minimum concentration horizontal scan lines, i.e., scan lines containing a small number of black pixels, interposed between other high concentration horizontal scan lines, i.e., scan lines containing a large number of black pixels, of that glyph line, the glyph line is recognized as comprising more than one line of text. In such an event, additional horizontal segmentation is performed on said glyph line by block 180, as shall be described later. Alternatively, if the horizontal distribution statistics indicate that the glyph line does not include minimum concentration horizontal scan lines interposed between high concentration horizontal scan lines, decision block 178 recognizes the glyph line as being only a single line of text and the close line height analysis procedure is terminated.

In the event that the glyph line is recognized by block 178 as comprising more than one line of text, block 180 separates the glyph line into its component lines based on horizontal distribution statistics provided for by block 174. In this regard, the glyph line is divided into shorter (i.e., lesser height) glyph lines by its being separated along the minimum concentration scan lines which have been determined to be interposed between higher concentration scan lines, thus resulting in each glyph line comprising only a single line of text.

The next step towards breaking the bit-mapped representation of the page into individual glyph elements is to determine whether the height of any of the glyph lines, as obtained through simple horizontal segmentation operation performed by block 120 (described heretofore), is a multiple of the height of the shortest line. In this regard, block 132 (FIG. 3) determines which if any of the glyph lines are multiples of the height of the smallest glyph line and marks those lines for further processing. Block 134 then selects one of the overly tall lines for further processing by block 128. In this regard, block 128 then performs close line height analysis on the line selected by block 134 in the same manner as described above. This procedure continues until all of the overly tall lines have been processed by block 128 to the point where block 132 determines that none of the lines are a multiple of the height of the shortest line. Upon such a determination being made, horizontal segmentation is terminated and vertical segmentation begins.

Figure 6:
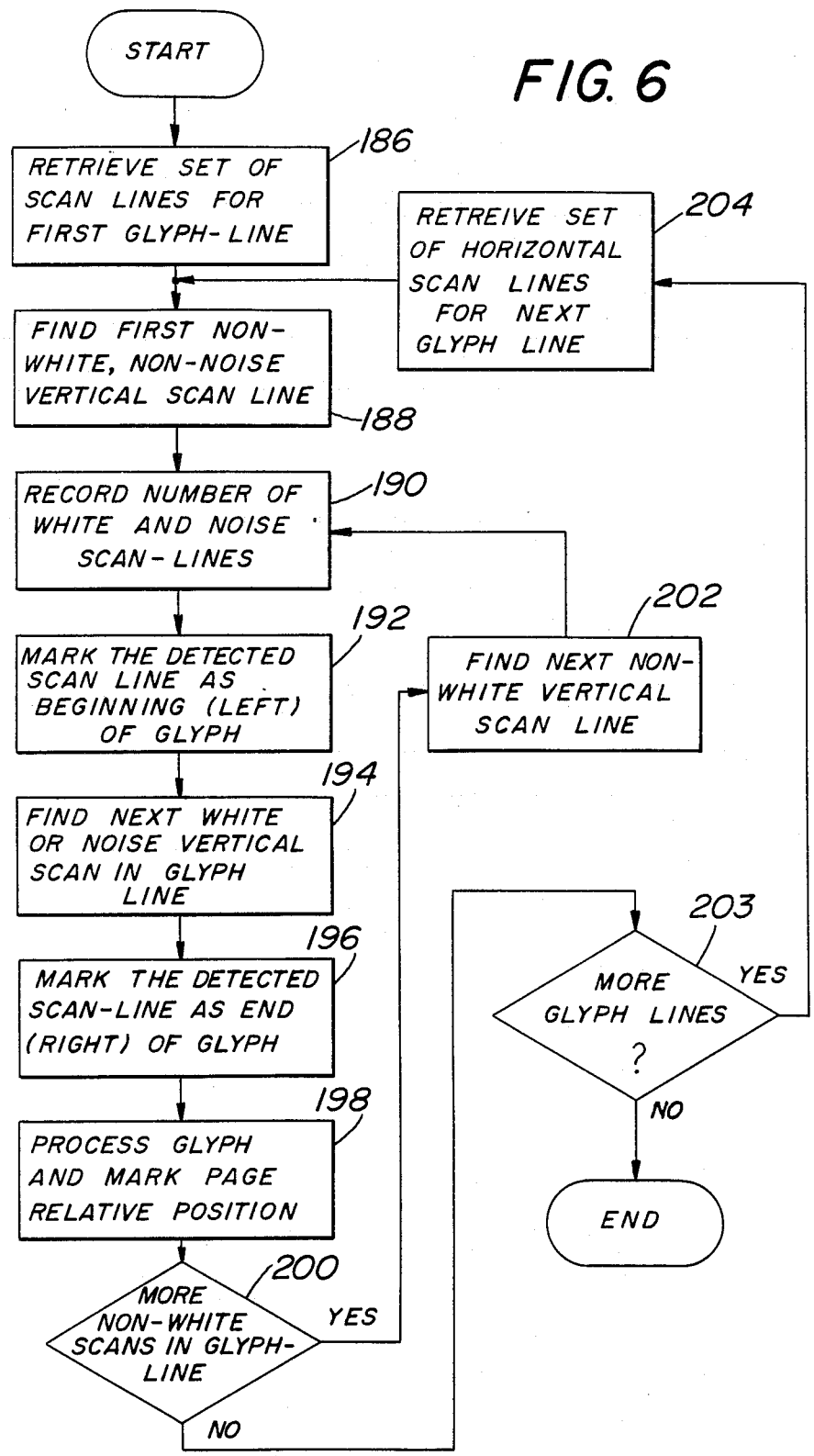
FIG. 6 is a flow chart showing the means for effecting vertical segmentation of glyph elements.

Vertical segmentation, is performed by block 136 and is shown in greater detail in the flow diagram of FIG. 6. As can be seen therein the procedure of vertical segmentation is performed by blocks 186–204.

Before describing in detail the various blocks for performing vertical segmentation, it should be mentioned that the vertical segmentation operation basically involves an analysis of the vertical white spacing located between individual glyphs in a line of text, to identify the boundaries between individual glyph elements. The vertical segmentation process also locates the larger white spaces between consecutive glyphs for later processing, to determine glyph words and blocks of glyph words. In this regard, a glyph word corresponds to a word of language and a glyph block corresponds to a group of words, e.g., a caption appearing on a page.

Referring to FIGS. 6 and 9, the first step of vertical segmentation is performed by block 186. That block retrieves the set of all horizontal scan lines corresponding to the first glyph line. Block 188 then locates the first non-white/non-noise vertical scan line in that glyph line. Each vertical scan line is formed by grouping together (e.g., locating and storing in a buffer) those pixels of respective horizontal scan lines of a glyph line, which are located at the same horizontal position on the page. Thus, in the preferred embodiment of the invention, vertical scan lines are readily formed through software analysis, which selects and groups together respective pixels to form sets of pixels corresponding to vertical columns of pixels on the page. The first non-white/non-noise vertical scan line is located by analyzing each vertical scan line of the particular glyph line, going from left to right, until certain criteria regarding the number and/or placement of black pixels along the vertical scan lines (i.e., at common horizontal positions along the horizontal scan lines) is satisfied. These criteria are used to distinguish between the first scan line of a glyph character and non-white noise which might appear on the page. Accordingly, block 188 locates the leftmost vertical scan line of the leftmost glyph element of the selected glyph line and counts the number of white or noise, vertical scan lines passed in going from the left edge of the page to the leftmost vertical scan line of the first glyph. Block 190 then marks or records the number of white or noise scan lines passed before reaching the first vertical scan line of the first glyph on the page. This information is later used for determining indentations and other characteristics pertaining to the nature in which the text appears on the page. Block 192 then records the first non-white/non-noise vertical scan line as being the first (leftmost) vertical scan line of the glyph character.

The scanning process continues, going from left to right across the glyph line until block 194 encounters another white or noise vertical scan line. The white or noise vertical scan line immediately following the non-white/non-noise vertical scan lines is then marked by block 196 as being the last or rightmost scan line of the glyph character.

Figure 7:
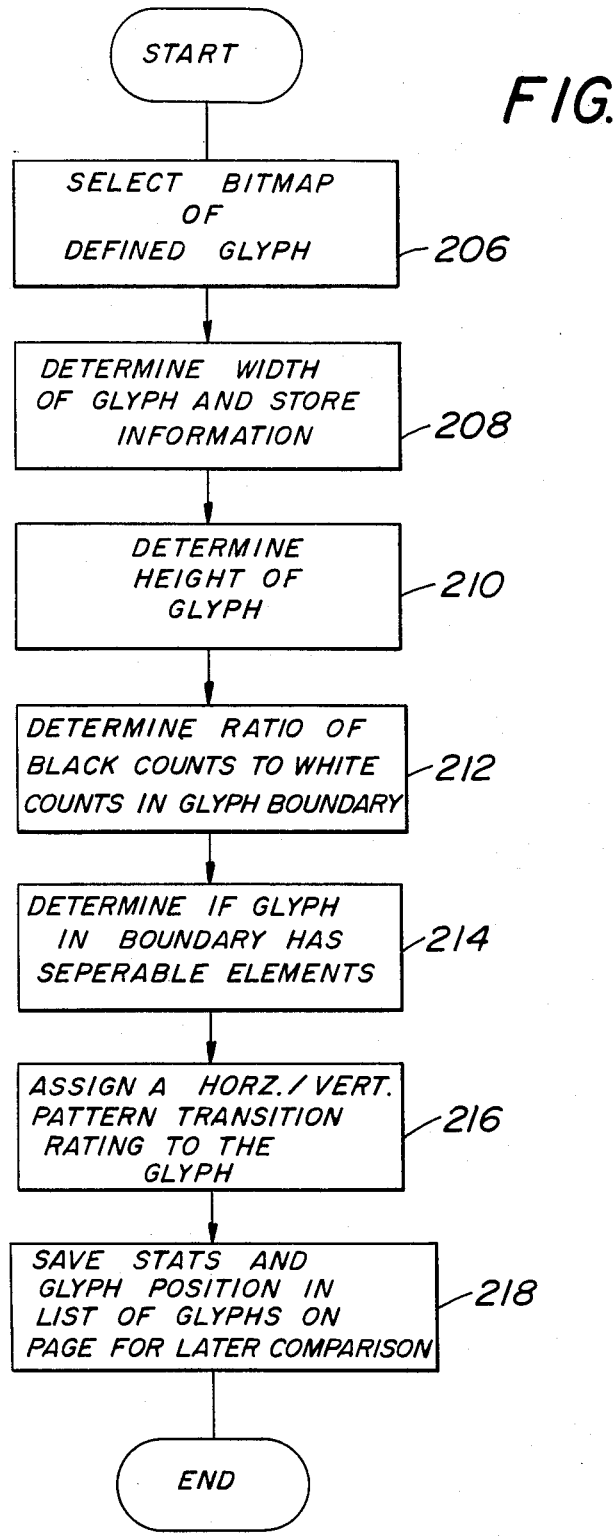
FIG. 7 is a flow chart showing the means used for processing and marking relative page positions for selected glyphs.

The next step towards processing individual glyphs is performed by block 198. In this regard, block 198 analyzes and obtains various identifying information pertaining to the just isolated glyph, including its position on the page (referred to as the "glyph's page—relative position"). The means for processing and marking the glyph's page-relative position is shown in greater detail in the flow diagram of FIG. 7 and consists of blocks 206–218. In particular block 206 selects the bit-map 280 (FIG. 9) of the particular glyph. The bit-map of a particular glyph is defined as the region enclosed or bounded by the uppermost and lowermost horizontal scan lines 282 and 284, respectively, of the glyph line 281 from which the glyph was selected and the leftmost and rightmost vertical scan lines, 286 and 288 respectively, of that glyph, as recorded by blocks 192 and 196 (FIG. 6), respectively. In other words, the periphery of the four intersecting scan lines obtained through horizontal and vertical segmentation, define a rectangular region in which the glyph lies. Once the bit-mapped region containing the glyph is selected by block 206, block 208 determines the glyph's width and stores this information. The width of the glyph is calculated by counting how many pixels wide the glyph is from its leftmost scan line 286 to its rightmost scan line 288.

Block 210 then determines the height of the glyph. The height of the glyph is determined by counting how many non-white, non-noise scan lines there are between the uppermost non-white, non-noise scan line to the bottom most non-white, non-noise scan line, of the glyph. Referring to FIG. 9, it can be seen that the uppermost and bottommost scan lines of the glyph, there shown are represented by reference numeral 290 and 292, respectively. Thus, it should be realized that the height of the glyph is not necessarily coextensive with the height of the glyph line.

Block 212 then counts the number of black pixels and the number of white pixels contained within the glyph's boundaries 294. Once the number of black counts and white counts have each been determined by block 212, block 212 then calculates the ratio of black counts to white counts and stores this information.

Block 214 then determines whether the particular glyph includes separable elements such as is found in the following characters: "i", "j", ";", "?", "!". This determination is based on a procedure which determines whether there are any all white or noise horizontal scan lines located between the uppermost and lowermost non-white scan lines of the particular glyph element. An all white or noise horizontal scan line is indicative of a separable element. In this regard, it should be appreciated that all of the above characters have separable elements and include a horizontal all white scan line located between their respective uppermost and lowermost boundaries.

Block 216 then assigns what is referred to hereinafter as a "horizontal pattern transition rating" to the glyph. In this regard, each horizontal scan line located within a glyph's boundary is assigned a transition rating based on the number of times it changes from white to non-white or vice versa. That rating is the horizontal pattern transition rating. Thus, for each number of transitions there is assigned an arbitrary, but unique, number. For example, a horizontal scan line across a particular glyph which first encounters white, then encounters black and finally encounters white might be assigned a value of three while a pattern which first encounters white, then black, then white, then black and then white might be assigned a value of seven. These transition ratings are then recorded for each horizontal scan line ranging from the uppermost to the lowermost scan lines contained in the particular glyph's boundaries. However, it should be noted that a horizontal scan line which encounters a pattern identical to the transition pattern of its immediately preceding scan line is not recorded, to enable information obtained through this analysis to be compressed into a lesser amount of computer memory. In addition to the transition pattern, data as to the horizontal locations within the glyph's boundaries where these transitions occur are recorded for each glyph, in order that a more precise determination as to differences among similar glyphs may eventually be made, if required.

Furthermore, a vertical transition rating is also obtained by block 216. The vertical transition rating is essentially the same as the horizontal transition rating, except for the fact that it relates to transitions occurring along vertical scan lines within the glyph's boundaries, starting with the glyph's leftmost vertical scan line and ending with its rightmost vertical scan line. The vertical transition rating thus provides additional descriptive information for differentiating the glyphs.

Still further, block 216 performs horizontal/vertical bar analysis which serves to further differentiate among various similarly shaped glyphs. To that end, the horizontal/vertical bar analysis entails first determining whether the glyph includes a black vertical straight line extending for substantially its entire height and then determining whether the glyph includes a black horizontal straight line extending for substantially its entire width. This analysis is particularly useful in distinguishing between glyph letters which differ mainly by their presence or absence of either a vertical straight line or a horizontal straight line, e.g., the "D" versus "O" and "U" versus "H", respectively.

Finally, block 218 records the page relative position of the glyph's boundaries and assigns pointers to a buffer which stores the statistics and other information descriptive of the glyph, as determined by blocks 206, 208, 210, 212, 214 and 216. This information is later used for identifying those glyphs which are substantially identical to other glyphs on the page as well as for other purposes, to be described later.

Once the selected glyph has been processed by block 198, block 200 (FIG. 6) determines whether there are any other non-white, non-noise vertical scan lines in the glyph line. If there are, block 202 locates the next non-white, non-noise vertical scan line in the glyph line and the vertical segmentation process is repeated, beginning with block 190. This procedure continues until all of the glyphs in the glyph line have been located and processed. To that end, once block 200 determines that there are no more non-white, non-noise vertical scan lines in the glyph line (e.g., there are no more glyphs in the glyph line), this information is provided to decision block 203 to determine whether there are any more glyph lines on the page. If there are other unprocessed glyph lines on the page, block 204 selects the horizontal scan lines for the next glyph line and the vertical segmentation procedure is repeated, beginning with block 188. This loop continues until such time that block 203 determines that all of the glyph lines on the page have been vertically segmented and processed as just described. At that point, vertical segmentation is complete and is terminated.

Once the bit-mapped representation of the page has been broken down into discrete glyph elements, block 104 (FIG. 2) calculates the median width of those glyphs and tags ligatures. It should be recalled that a ligature is two or more symbols of language which are physically joined together. Once the median width of all of the glyphs on a page is determined, any glyph which is exceptionally wider than the average glyph is suspected as being a ligature. Each of these extra wide glyphs is then vertically segmented based on an analysis of the vertical scan lines contained within its boundaries. This analysis determines which vertical scan lines contain a minimum distribution of vertical black counts. By using data as to minimum vertical black counts along with knowledge as to the average glyph width, vertical segmentation is effected. Moreover, the weight given to the identifying statistics for those glyphs formed from ligatures is generally altered to take into account the fact that a certain amount of error is normally introduced during segmentation.

Figure 8:
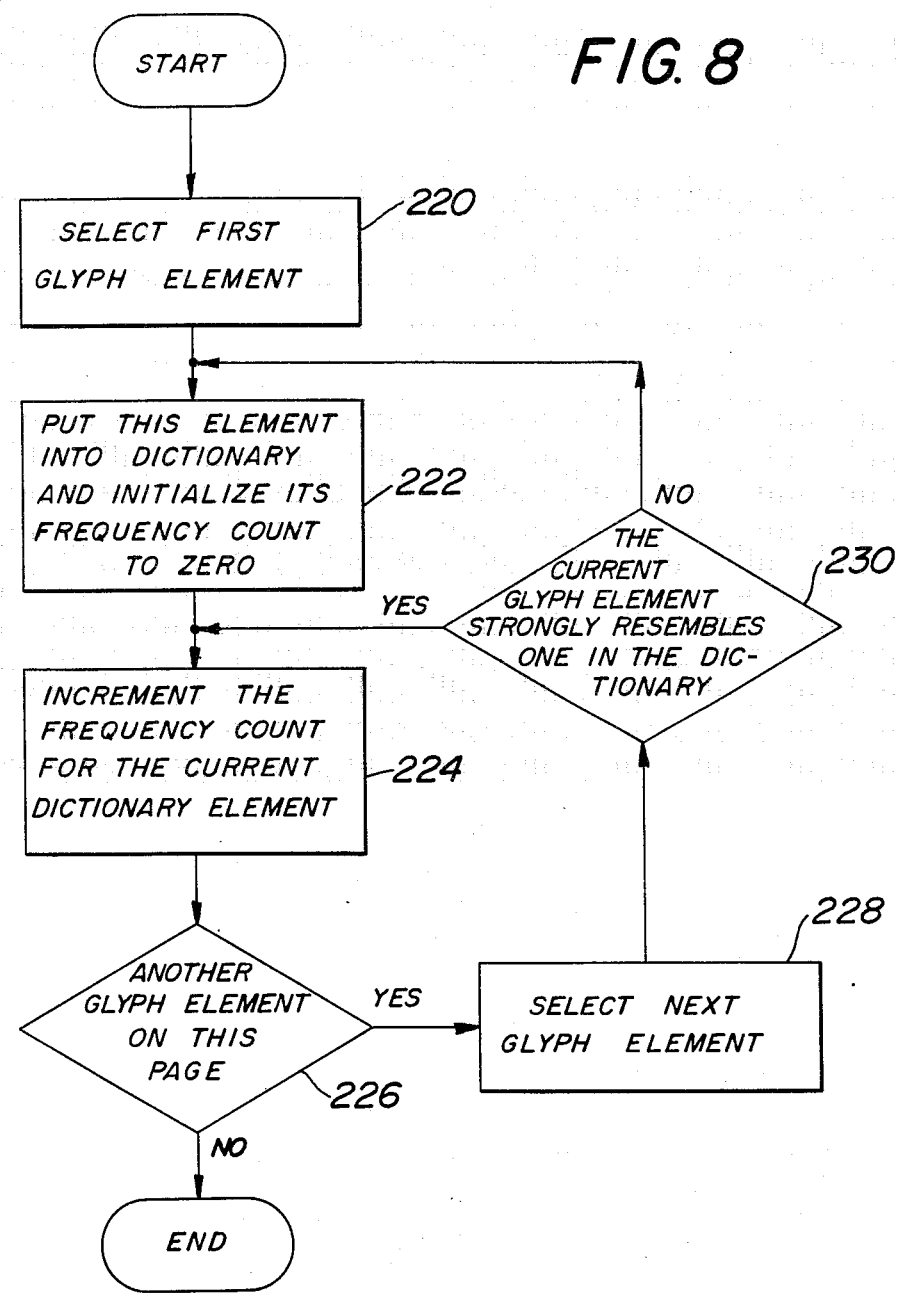
FIG. 8 is a flow chart showing the means used in compiling a list of glyph element types and their respective frequencies.

Once the average element (glyph) width has been determined and the ligatures have been separated, block 108 (FIG. 2) compiles an element dictionary or list which includes each glyph type and its frequency (i.e., how many of each glyph there are on the page). The operation of compiling the list of glyph types and their frequencies is shown in the flow diagram contained in FIG. 8. To that end, the glyph list compilation is effected by blocks 220-230.

In particular block 200 selects the first glyph by choosing that glyph located along the uppermost glyph line, which intersects the leftmost vertical scan line. Once the first glyph has been selected by block 220, the block 222 places the selected glyph in the glyph list or dictionary and initializes its frequency count at zero. The glyph is placed in the dictionary by its being assigned an arbitrary identifying number. The identifying number is then associated with various pointers, each directed towards certain pieces of descriptive information, including the information obtained by blocks 206, 208, 210, 212, 214, 216 and 218, as discussed above. For example, each glyph on the list includes pointers directed to memory locations listing the number of separable elements comprising that glyph, the ratio of black to white pixel counts contained within the the glyph's boundaries, etc. Still further, each glyph also includes a pointer directed to a memory location containing the bit-mapped representation of the glyph. This information is later used to determine whether two glyphs of similar appearance are, in fact, the same.

Once the selected glyph has been placed in the glyph dictionary by block 222, block 224 increments by one the frequency count for the selected glyph. Obviously, in the case of the first glyph selected by block 220, the frequency count for that element is incremented from zero to one. Block 226 then determines whether there are any other glyphs on the page. If there are additional glyphs on the page, this information is provided to block 228 which selects another glyph. In this regard, the order of selection is not important, although in the preferred embodiment of the invention, glyphs are selected sequentially from left to right across glyph lines starting with the uppermost glyph line and ending with the lowermost glyph line on the page.

The glyph selected by block 228 is then compared by decision block 230, to the glyphs already in the glyph dictionary or list, to determine whether the newly selected glyph strongly resembles one of the other glyphs already contained in the dictionary. This determination is made by initially comparing certain glyph characteristics, to see if any or several of the glyphs in the dictionary contain those characteristics. For instance, one characteristic which is compared is whether the glyph includes separable elements. Obviously, if the newly selected glyph does not have separable elements, an immediate determination can be made that those glyphs in the dictionary which include separable elements do not match the selected glyph. Thus, block 230 narrows the number of possible candidates for a match from among all those glyphs in the glyph dictionary. In practice, different weights are given to the different criteria or characteristics used, in order to optimize the comparison process.

If the selected glyph is determined to be similar to one or several of the glyphs listed in the glyph dictionary, further processing is done to determine whether there is, in fact, a match. This further processing comprises a comparison of the bit-mapped representations of the selected glyph to the bit-mapped representations of those glyphs in the glyph dictionary, which are deemed candidates for a match. This comparison entails making a determination as to how many of the pixels in the respective images differ. The figure obtained through such a comparison is then compared to a predetermined number, to decide whether or not the selected glyph should be deemed a match.

If it is determined that the glyph being processed matches a glyph already listed in the dictionary, block 224 increments by one the frequency count for the listed glyph and decision block 226 determines whether there are any more glyphs on the page which have not yet been processed. At that point, if there are additional unprocessed glyphs, block 228 selects the next unprocessed glyph and then the system loops back to block 230. If block 230 determines that the selected glyph is not sufficiently similar to any of the glyphs listed in the dictionary, this information is provided to block 222. Block 222 then adds the selected glyph to the dictionary and initializes (resets) its frequency count to zero. Block 224 then increments the frequency count of the newly added glyph to one and decision block 226 determines whether there are any other unprocessed glyphs on the page. The loop continues in the same manner as described above, until such time that block 226 determines that there are no additional unprocessed glyphs remaining on the page. At that point, the dictionary list is complete, and thus includes each glyph on the page, along with a pointer to memory storing its respective frequency count.

As set forth heretofore with reference to FIG. 2, the system 20 effects the identification of each punctuation type via block 112. In particular, after the list of glyph types and their frequencies have been compiled as just described, the block 112 analyzes all of said glyphs in order to identify punctuation. By punctuation it is meant all symbols of language (characters) other than letters or numbers.

Punctuation is recognizable using an operation consisting of a small number of relatively simple shape analysis tests. That operation is shown clearly in FIG. 19. Confirmation of the punctuation identification results produced by block 112 of system 20 is effected once glyph letters and words have been determined by using cryptanalytic/contextual geographic analysis. For example, a glyph tentatively identified as a "?" by block 112 is confirmed by the existence of an interrogative pronoun, e.g., who, what, why, etc., as the first or second glyph word of a glyph sentence. A glyph tentatively identified as ")" and which encloses a string of integers representing a negative number exceeds the bounds of the rightmost columnal justification of numerals. The first step in the process of recognizing and identifying punctuation is performed by block 237. In particular, block 237 analyzes all of the glyphs on the page to determine the smallest glyph which is at least 3 pixels high by 3 pixels wide. The smallest glyph which is at least 3 by 3 pixels is determined to be the period. Those glyphs smaller than 3 by 3 pixels are assumed to be noise and are not processed further.

The next step towards identifying punctuation is performed by block 238. Block 238 selects a glyph from the page using some predetermined criteria, i.e., the leftmost glyph on the uppermost line on the page. Decision block 239 then determines whether the just selected glyph reaches the bottom of its glyph line. If it does not reach the bottom of the glyph line, the glyph belongs to the group of punctuation marks or characters composed of a quotation mark ("), an apostrophe ('), a dash (—), an asterisk (*), a plus sign (+), an equal sign (=), a caret (∧), a greater than sign (>) and a less than sign (<). Thus block 239 provides the information indicating that the glyph does not reach the bottom of the line to block 240. It is block 240 which identifies the particular glyph from the group by using shape analysis techniques. Such techniques include analyzing the glyphs shape to determine whether the glyph reaches the middle of the line, whether it has separable elements, how many different line segments the glyph includes, and the angle or orientation of the glyph.

Once the glyph has been identified by block 240, this information is marked (recorded in a punctuation list 241). Block 242 then determines whether there are any more glyphs on the page. If not, then all of the punctuation on the page has been identified. If, however, block 242 determines that there are other glyphs on the page, the system loops back to block 238 to select the next remaining glyph on the page for identification and punctuation identifying process is repeated.

If block 239 determines that the selected glyph does reach the bottom of the glyph line, decision block 244 takes this information to make the further determination as to whether the glyph reaches the middle of the line. If the glyph does not reach the middle of the line, block 244 recognizes the glyph as being either a comma or a period. Block 246 determines whether the glyph is a period as opposed to a comma. Since the period had previously been identified by block 237 as being the smallest glyph on the page, if the selected glyph is substantially larger than the glyph determined to be a period, block 246 identifies the glyph as being a comma. Conversely, if the selected glyph is not substantially larger than the smallest glyph, it is identified as being a period. Once the glyph has been identified by block 246 this information is added to the punctuation list 241 and block 242 determines whether there are any more glyphs on the page. If so, the system loops back to block 238 to identify the next glyph, as described heretofore.

If block 244 determines that the glyph reaches the middle of the line, block 248 then makes a further determination as to whether the glyph includes separable elements. If the glyph includes separable elements, decision block 250 then determines whether the bottom most element of the glyph reaches the middle of the line. If the bottom most element does not reach the middle of the line the glyph belongs to the group of punctuation marks or characters composed of an exclamation mark (!), a question mark (?), a semicolon (;) and a colon (:). Block 250 provides the information that the bottom element of the glyph does not reach the middle of the line to block 252. Block 252 then determines the identity of the glyph from the foregoing group of four punctuation marks using the following analysis techniques: a semicolon or colon is readily distinguished from the exclamation mark and question mark by determining whether or not the top element is a period (a mark already identified), since the top element of both the semicolon and the colon is a period. Block 252 distinguishes the semicolon from the colon by looking to see if the bottom most element is a period. If it is, the glyph is a colon. As between the exclamation mark and the question mark, the exclamation mark is identified by block 252 comparing the glyph's top element with its mirror image. If the top element of the mark is identical to its mirror image, a conclusion is drawn that the glyph is an exclamation mark as opposed to a question mark. Once the glyph has been identified by block 252 this information is added to the punctuation list. Block 242 then determines if there are any more glyphs on the page. If so, the system loops back to block 238 to analyze the next glyph.

If block 250 determines that the glyph does reach the middle of the glyph line, the glyph is not a punctuation mark or character but rather, is a non-punctuation glyph, e.g., a glyph letter or number. In that regard, this information is provided by block 250 to block 256. This block determines if the glyph includes a period as its uppermost element. If so the glyph is marked as being either the letter "i" or the letter "j". This information may later be called upon as a supplement to the cryptographic analysis techniques used in identifying the glyph letters, as shall be described later. Block 242 then determines if there are any more glyphs on the page. If so, the system loops back to block 238 to analyze the next glyph.

Referring once again to block 248, if block 248 determines that the glyph does not have separable elements, this information is provided to decision block 260. This block determines whether or not the glyph is a slash based on the knowledge that a slash comprises a non-horizontal straight line. Should block 260 determine that the glyph is in the shape of a non-horizontal straight line, such information is provided to block 262. This block then determines whether the slash is a left angling, a right angling or a vertical slash. Such a determination is accomplished through the use of simple shape analysis techniques, e.g., by identifying the angle at which the line is disposed. Once the glyph is identified it is marked. Block 242 then determines if there are any more glyphs on the page. If so, the system loops back to block 238 to analyze the next glyph.

Should block 260 determine that the glyph is not a slash, then that information is provided to block 264. This block makes a determination as to whether the glyph includes an area of white which is totally surrounded by the black portion of the glyph, such an area being called "captured white". If block 264 determines that there is no captured white in the glyph, decision block 268 determines whether the glyph is either a parenthesis ((), a bracket ([]), a greater than (>) or a less than sign (<). This determination is made based on several criteria. Firstly, parentheses and brackets are recognized by the fact that they are the only punctuation characters as tall as or taller than the average height of an upper case (capital) letter. Furthermore, the top half of parentheses and brackets are the exact mirror image of their respective bottom halves. Still further, brackets and parentheses include no points where more than two lines intersect or where one line runs into and intersects the middle of another line. The only glyph letter which meets all of these criteria is the upper case letter "C". However, the upper case "C" is readily distinguished from a parenthesis or a bracket based on some simple analysis. In this regard, if a mirror image of the particular glyph can be found anywhere on the page, it can be concluded that the glyph is not the upper case "C", but rather, is either a bracket or parenthesis. Additional methods of determining or distinguishing the upper case "C⇌ from a bracket or a parenthesis involve the fact that the upper case "C" includes no sharp corners (unlike the bracket) and does not reach as high as a parenthesis. Similarly, the greater than and less than signs are readily distinguishable from the upper case "C" by the fact that they both include a sharp corner.

Should block 268 determine that the glyph is either a parenthesis, a bracket, a greater than or a less than sign, further analysis is performed on the glyph by block 270 to distinguish among the above mentioned punctuation types. In this regard block 270 determines whether the glyph is, in fact, a parenthesis, bracket, greater than or less than sign by identifying and counting the number of sharp corners contained in the mark. In particular this analysis uses the knowledge that parentheses include no sharp corners, the greater than and less than signs each include a single sharp corner and the bracket includes two sharp corners. Furthermore, a left parenthesis is distinguished from a right parenthesis by identifying its direction of curvature. Similarly, the left and right brackets and the greater than and less than signs are each distinguished from their respective counterparts using a similar procedure. Once the glyph has been identified and marked by block 270, block 242 then determines if there are any more glyphs on the page. If so, the system loops back to block 238 to analyze the next glyph. If block 268 determines that the glyph is not a parenthesis, a bracket or a greater than or less than sign, a conclusion is drawn that the glyph is a non-punctuation type of glyph. This information is then provided to block 256, which as mentioned above, marks the particular glyph as a non-punctuation character and stores this information for later processing by the decryption means 30.

If a determination is made by decision block 264 that the glyph includes captured white, this information is provided to block 276. Block 276 then recognizes and marks the glyph as being either a non-punctuation glyph (e.g., a number or letter glyph) or one of the following symbols: a "number" sign (#), a dollar sign ($), a percentage sign (%) or an ampersand (&). The glyph marked as such by block 276 is not processed further at this point. Thus, if the glyph marked by block 276 is, in fact, not a letter or a number glyph, but is a glyph corresponding to one of the above-mentioned symbols, it will eventually be identified as such by either the document type analaysis means 28 or the decryption means 30.

With respect to the dollar sign ($), if the document is a financial report, the document type analysis means should identify the dollar sign as such based on its position on the document and its relationship to number glyphs appearing thereon. If the document is not a financial report, the dollar sign will initially be dealt with by the decryption means 30 as though it were a number glyph. In such event, the dollar sign would eventually be decoded either through the use of shape analysis techniques or during cryptarithm analysis (to be described later), depending upon whether there is sufficient numerical information available in the document to perform cryptarithm analysis. Assuming there is sufficient numerical information available to employ cryptarithm analysis, the dollar sign is identified by the fact that it always precedes a string of numbers and includes double captured white. If there isn't sufficient numerical information available, the dollar sign is decrypted along with the number glyphs, using a "backup" decryption routine, such as shape analysis (as shall be referred to later).

The number symbol (#) is later identified by the decryption means 30, either based on the fact that it always either precedes or follows a string of numbers (the latter occurring when it is used as a pound sign) and only includes single captured white, thus distinguishing it from the dollar sign. Alternatively, if there is an insufficient amount of numerical information available in the document to employ cryptarithm analysis, the number sign is identified by using shape analysis techniques.

The percentage symbol (%) is later identified by the decryption means 30, based on the fact that it always follows a string of numbers and includes double captured white. If there is an insufficient amount of numerical information available in the document to employ cryptarithm analysis, the percentage symbol is identified by using shape analysis techniques.

Finally, the ampersand (&) is later identified by the decryption means 30, based on its being the only single glyph word which contains double captured white.

Once the selected punctuation glyph has been processed as above-described, block 242 then determines whether there are any other glyphs on the page which have not yet been processed, for purposes of determining whether they are punctuation. If there are additional glyphs remaining on the page, block 238 selects the next glyph to be processed, beginning with block 239. Thus, this loop continues until block 242 determines that all of the glyphs on the page have been processed.

Once all of the punctuation has been identified, block 116 (FIG. 2) identifies groups of glyphs as being glyph "words". In this regard, word identification, as performed by block 116, is a relatively simple procedure which recognizes a "word" beginning or ending from the presence of more than a predetermined amount of white space, separating consecutive glyphs. This predetermined amount of white space is calculated based on the average amount of white space appearing between consecutive glyphs. Thus, if the spacing between selected glyphs is substantially greater than the average white space between consecutive glyphs, a boundary denoting the beginning and/or end of a glyph word(s) is recognized. Furthermore, certain types of punctuation, e.g., a period, is also used as a signal, for indicating the end of a glyph word. Once a glyph word has been identified as just described, it is stored in a temporary buffer 36 (FIG. 1), in order that further processing may be performed thereon, as shall be described in detail later.

The next step to be performed by the system 20 is called "document-type" analysis. This procedure is effected by document-type analysis means 28 (FIG. 1). In particular, means 28 attempts to identify the input page of text as being that of a particular type of document, e.g., a balance sheet, business letter, etc. If the page of text is in fact an identifiable type of document, its identification as such generally provides a great deal of useful information, which is later used by the decryption means 30 when decoding the glyph elements.

Block 28 determines document type by comparing the geographic layout or location of glyph words on the page, with information contained on preselected nameplates 38. These nameplates include descriptions of known layouts associated with particular types of documents. Additional information is obtained by identifying certain known glyph patterns (e.g., repetitions of the same glyph), which are associated with particular document types. Thus, it should be appreciated that this comparison is made possible by the fact that financial reports, invoices, outlines, computer programs, minutes of meetings, business letters, etc. each generally include a somewhat uniquely identifiable arrangement of glyph words on the page. For example, a business letter will generally have a salutation such as "Sincerely Yours, Cordially Yours", etc. and also a name, adjacent the lower right hand portion of the page. Block 28 identifies the specific type of document, by sequentially selecting document type nameplates 38 from a set of such nameplates stored in system 20 or entered therein from some input means, e.g., a keyboard. Each of the nameplates 38 includes data as to the geographic location of where certain glyph words are likely to be found, assuming the page comprises the particular type of document associated with said nameplate. If there is a sufficient amount of correspondence between the glyph locations on the input page, and the patterns provided for on the particular nameplate, block 28 identifies the page of text as being the particular type of document associated with that nameplate. The nameplates 38 are stored in tables in what shall be referred to as the system's stored knowledge base. The stored knowledge base and its tables may readily be modified to accomodate the particular types of documents generally encountered in the particular environment in which the system is being used.

As an example, a typical nameplate used for identifying a business letter would look for a return address block, a date block, a salutation, a complementary close, a signature, a typed name beneath the signature and a glyph word with the pattern "AA:", for carbon copies, where the pattern "AA" represents any repeated glyph.

Moreover, the document type analysis means obtains still additional information used for purposes of identification by comparing the size and location of various blocks of glyphs (groups of glyph words) against those set forth on the particular nameplate 38. For example, a return address block is recognized as generally being the first thing on the page of a business letter (except for possibly the company's letterhead), it is left justified near the middle of the page with nothing parallel and to the left of it and comprises three to five lines of text. If enough of these features are present, the document is recognized as being that of a business letter.

Similarly, a document is recognized as being a financial report by the financial report nameplate, if the page of text contains a header having the pattern of glyphs "ABCBDEF GHFFI", representing the words "BALANCE SHEET" or a header "ABCBDEDFB GH IGFJKBKGF", representing tne words "STATEMENT OF CONDITION". In this regard, other headers which are indicative of a balance sheet would include letter patterns representing the captions "ASSETS" or "LIABILITIES" and terminators of blocks having letter patterns corresponding to the words "TOTAL" or "TOTALS". The foregoing words are particularly revealing inasmuch as each of them includes one or several glyphs which repeat at predetermined positions within their respective words. Other considerations used for identifying a balance sheet might be right justification of one or more columns, since right justification generally suggests a column of numbers.

Thus, it should be appreciated that the document type analysis procedure uses methods and techniques provided for in the particular tables or other portions of the knowledge base to determine whether the input document sufficiently corresponds to respective nameplates. As shall be described later, if the above mentioned analysis indicates that the input page is, in fact, a particular type of document, a particular decryption routine is then selected based on this determination. On the other hand, if the input page does not fit any of the document type nameplates in the knowledge base, a conclusion is drawn that the document type cannot be determined and standard English text is assumed.

Once the document type analysis means 28 has either identified the document type or has reached the conclusion that the document type cannot be determined and thus assumes the page to be that of standard English text, the decryption means 30 (FIG. 1) analyzes the glyph words appearing on the page to identify the particular symbols of language which correspond to the glyphs on the page.

Figure 10A:
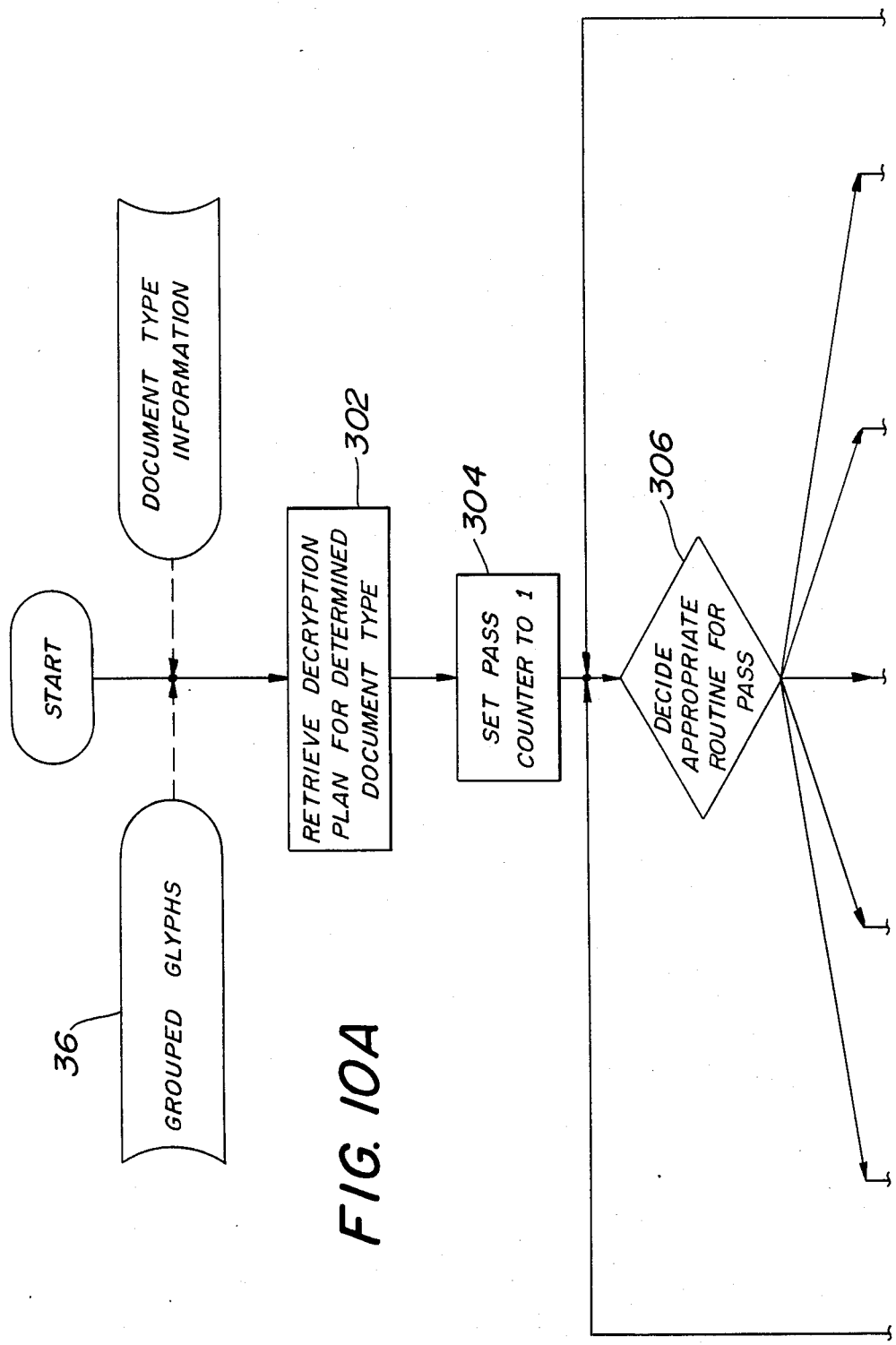
FIGS. 10A and 10B together comprise a flow chart showing the means used for effecting the decryption process performed by the decryption means shown in FIG. 1.
Figure 10B:
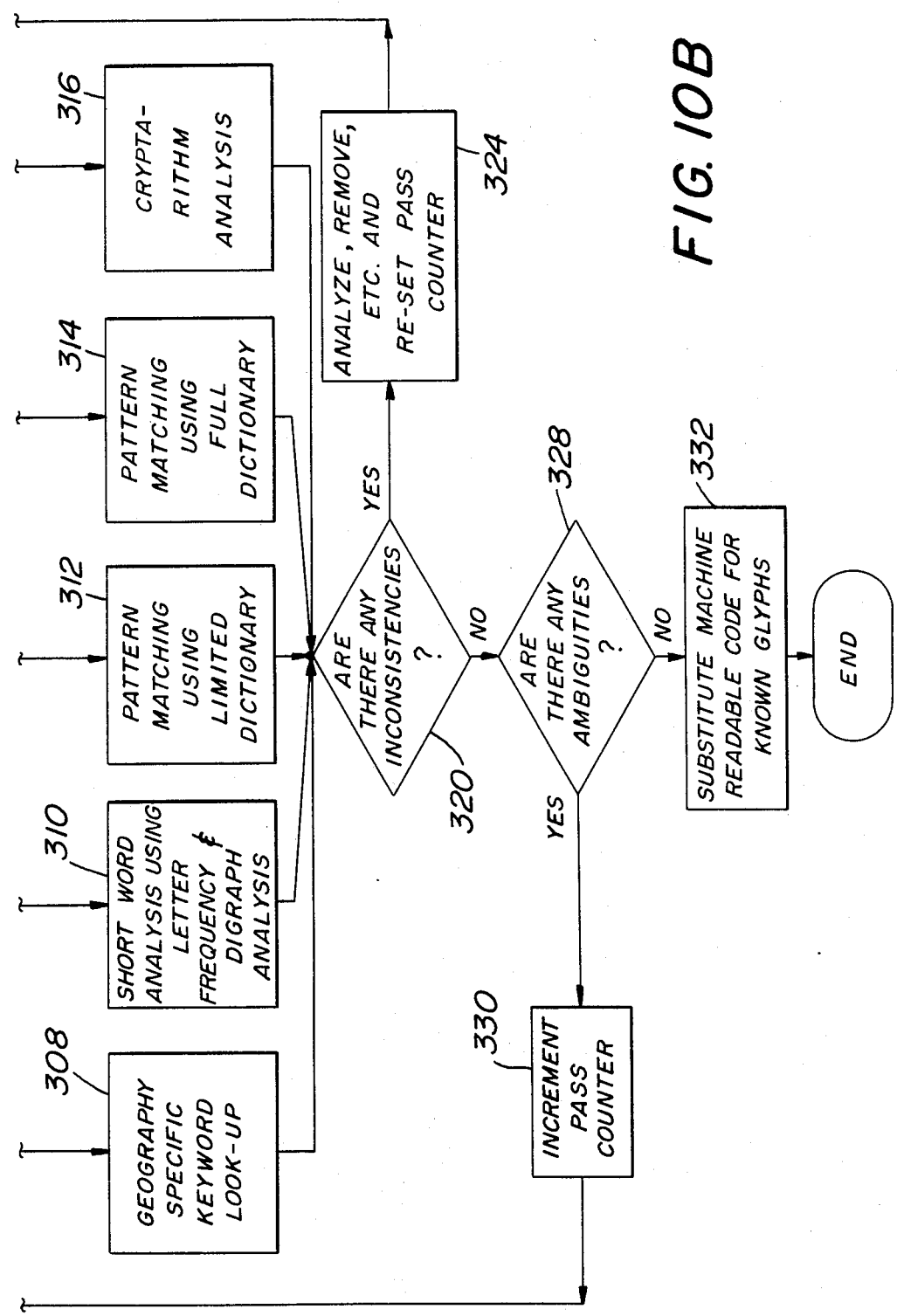
Figure 10C:
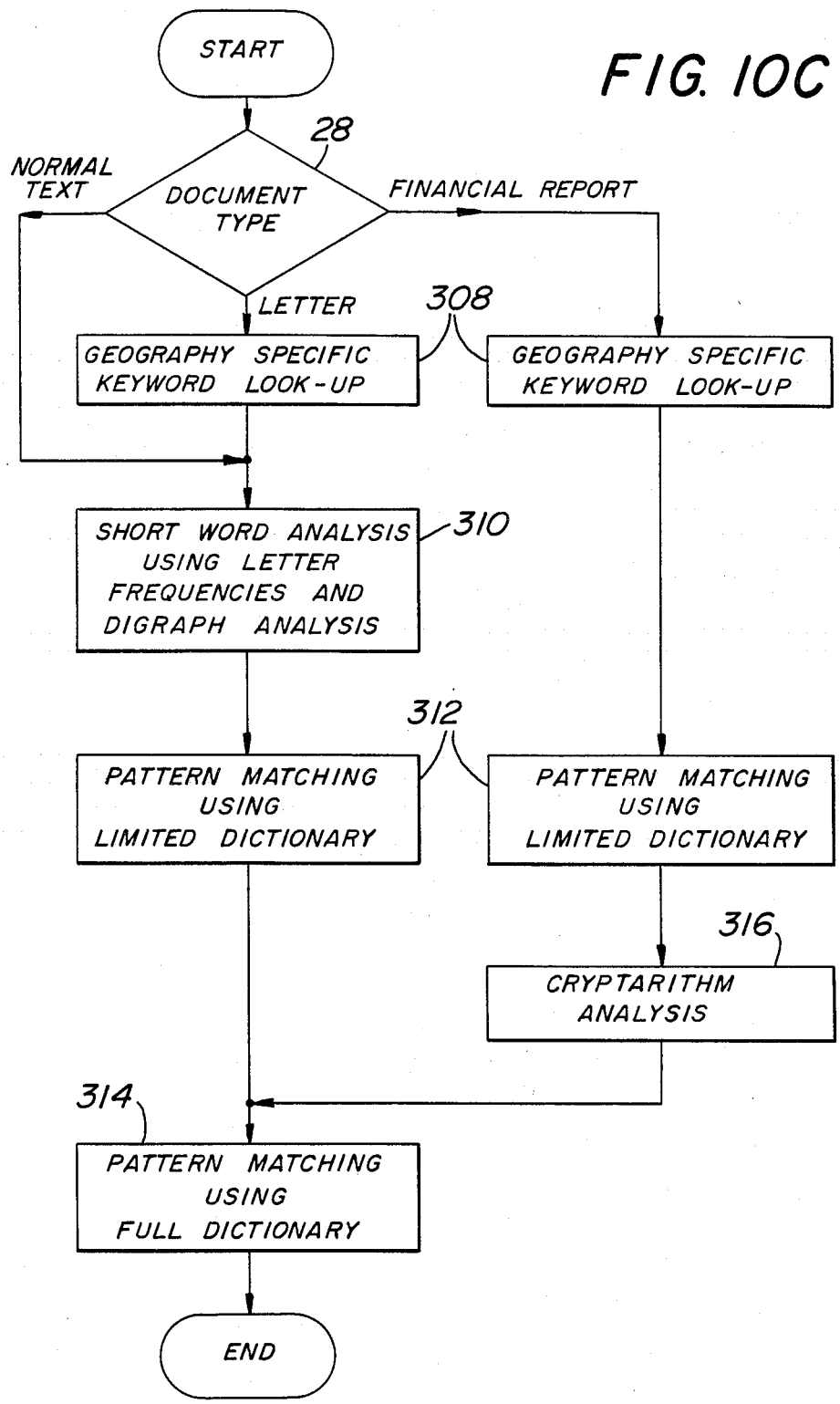
FIG. 10C is a flow chart showing the particular decryption routines used for decoding various selected types of documents.

The decryption means 30 (FIG. 1) basically comprises logic circuitry or software contained in a general purpose computer for performing various functional steps on the glyph elements and glyph words to decode or decrypt those symbols. In this regard, there is shown in FIGS. 10A and 10B the functional blocks comprising the decryption means. Moreover, there is shown in FIG. 10C the particular decryption routines of FIGS. 10A and 10B which are performed on certain selected types of documents, e.g., letters, financial reports and normal text, as determined by the document type analysis means 28 (FIG. 1).

It should first be pointed out that the techniques and routines used for decrypting glyph letters and glyph numbers generally do not depend on the glyph's geometry or shape, but rather depend upon the context in which the glyph appears. By context, it is meant the interrelationship among different glyphs on the page, the frequency with which a particular glyph occurs, the location of glyphs on a particular type of document, etc. (as described earlier). With respect to glyph numbers, cryptarithm techniques are used to identify individual numbers or digits, also from the context in which the glyph numbers appear. Moreover, in analyzing multippage documents the system 20 utilizes manuscript conventions, e.g., consecutive page numbering, consecutive footnote numbering, etc., to provide information regarding the glyph numbers. The foregoing cryptarithmic techniques of decoding unknown numbers shall generally be referred to hereinafter as cryptarithmic analysis. It should be pointed out however, that where there are an insufficient quantity of numbers on the page of text to apply the cryptarithmic analysis techniques, such as often occurs in normal text or in business letters, conventional shape analysis techniques may be substituted for the cryptarithmic analysis technique in order to decode the numbers. However, if the document type analysis means 28 determines that the document is a financial report, cryptarithmic analysis may readily be used to identify the glyph numbers on the page.

Referring to FIGS. 10A and 10B, block 302 of the decryption means selects a decryption plan, based on information received from the document type analysis means 28. Moreover, the routines shown in FIGS. 10A and 10B utilize grouped glyph information 36, as provided for by the separating means 26. Once the decryption plan has been selected by block 302, block 304 sets a "pass" counter (i.e., a counter storing the number of iterations of a decryption routine) to the value one. Block 306 then determines the appropriate decryption routine to be used during the current pass based on the document type involved and the routines which have been completed during previous passes. In this regard, the decryption routines which may be selected by block 306 include block 308, which performs geography specific keyword look-ups from knowledge base tables (to be described later), block 310, which performs short word analysis using letter frequency and digraph determinations from knowledge base tables (to be described later), block 312, which performs pattern matching using a limited dictionary from knowledge base tables (to be described later), block 314, which performs pattern matching using a full dictionary from knowledge base tables (to be described later) and block 316 which performs cryptarithmic analysis from knowledge base tables (to be described later).

Once the particular decryption routine has been selected and performed, decision block 320 determines whether there are any inconsistencies in the results obtained during the previous pass. If there are inconsistencies, block 324 analyzes the inconsistencies and removes certain of the selected glyph/letter correspondences previously assumed to be true, based on the nature of those inconsistencies. Block 324 then sets the pass counter to a certain value, so as to either cause the decryption routine which yielded the inconsistent results to be repeated, or alternatively, to cause one or several of the other previously completed decryption routines to be repeated, depending upon the specific nature and type of inconsistency which has occurred.

On the other hand, if block 320 determines that there are no inconsistencies, decision block 328 determines whether there are any ambiguities remaining. If there are ambiguities remaining (i.e., glyphs which have not been decrypted), block 330 increments the pass counter by one and block 306 selects the next decryption routine to be performed, based on the page's document type classification. If, however, block 328 determines that there are no ambiguities, i.e., all of the glyphs have been determined, block 332 substitutes machine readible code for the known glyphs as they appeared at the input means 24, thus establishing a machine code representation of the input page.

Furthermore, in multipage documents, once the glyph/character correspondences have been determined on any particular page of the document, e.g., the first page, this information is then applied towards decrypting the other pages of the document. To that end, the remaining pages of the document are readily translated, e.g., into machine readable code, without requiring that the decryption routines used for analyzing the first page be repeated. Moreover, in accordance with one optional aspect of the system 20, a person feeding the multipage document to the sensory input means can enter the number of pages composing the document into the system 20 through the use of a keyboard or other data entry device.

Referring to FIG. 10C, operation of the decryption routines will be considered. To that end if the document type analysis means 28 determines that the input document is a letter, a particular decryption scheme is selected. That scheme starts with block 308B, for effecting geography specific keyword look-ups (to be described later), followed by block 310B, for effecting short word analysis using letter frequency and digraph analysis (to be described later), block 312B for effecting pattern matching using a limited dictionary (to be described later), and finally block 314 for effecting pattern matching using a full dictionary (to be described later).

If, however the document type is determined to be a financial report, another decryption scheme is selected. That scheme includes block 306C, for effecting geography specific keyword look-ups (to be described later), followed by block 312C, for effecting pattern matching using a limited dictionary (to be described later), followed by block 316, for effecting cryptarithmic analysis (to be described later) and finally block 314, for effecting pattern matching using a full dictionary (to be described later).

If the document type is determined to be plain text, yet another decryption scheme is selected. That scheme is an abbreviated version of the "letter" routine and hence starts with block 310, for effecting short word analysis using letter frequencies and digraph analysis, followed by block 312, for effecting pattern matching using a limited dictionary and ending with block 314, for effecting pattern matching using a full dictionary.

The document-type decryption routines shown in FIG. 10C shall now be described.

Thus, the geography specific keyword look-up routine, as performed by block 308, basically comprises means for selecting appropriate keywords stored in knowledge base tables of the system and based on the particular type of document involved. Block 308 thus determines whether those keywords appear on the page at certain predetermined locations. For example, if the document is known to be a letter, keywords such as "Sincerely", "Respectfully yours", etc., are searched for towards the bottom of the page.

Short word analysis using letter frequency and digraph analysis, as performed by block 310, basically involves a set of routines for decrypting certain frequently occurring short words stored in tables of the knowledge base. For example, the word "the", is searched for and identified based generally on information concerning the frequency of occurrence of certain glyphs or combinations thereof contained in the word.

Pattern matching using a limited dictionary, as performed by block 312, basically compares glyph words, some of whose glyph letters have been determined, with words in a limited dictionary stored in tables of the knowledge base, to ascertain whether the glyph words include letter patterns corresponding to any of the words in the limited dictionary. In that regard, the limited dictionary comprises a list of the most commonly used words in the particular language.

Pattern matching using a full dictionary, as performed by block 314, is similar to the routine performed by block 312, except that the glyph words are compared to a much larger list of words, such as all those contained in a full dictionary, e.g., the Webster's Unabridged Dictionary, stored in tables of the knowledge base, to also identify certain glyph words as corresponding to words in that dictionary.

Cryptarithm analysis, as performed by block 316, basically comprises the application of various rules of numbers and other means of analysis stored in tables of the knowledge base to determine which digits correspond to particular glyph numbers. These methods, although generally associated with number games, often provide sufficient information to determine glyph/number correspondences. For example, the first glyph in a string of four consecutive glyphs adjacent the top edge of a page in a business letter is in all likelihood the number one, corresponding to the first number in the year. Included in these methods is also means for deriving information based on mathematical equations and relationships, whenever such appear in certain types of documents, e.g., financial reports.

With the above mentioned general descriptions of the various decryption routines having been set forth, the various functional means for performing those routines shall now be described in much greater detail. In this regard, short word analysis and digraph analysis as performed by block 310 is shown in greater detail in FIG. 11. To that end, the short word analysis means basically comprises blocks 340, 344, 348, 352, 356, 360 and 364. Block 340 sorts all of the glyph words identified by block 216 (FIG. 2) into four separate categories. These categories consist of those words containing one glyph letter, two glyph letters (a digraph or digram), three glyph letters (a trigraph or trigram) and more than three glyph letters, respectively. In Table 1.1 herein there is shown a single character glyph occurrence table. Table 1.2.1 shows a digraph/ligature glyph occurrence table. Table 1.2.2 shows a character and punctuation symbol digraph glyph and ligature occurrence table. Table 1.2.3 shows a three character trigraph glyph and ligature occurrence table and Table 1.2.4 describes a four character quadrigraphic glyph and ligature occurrence table.

The information regarding the categories of glyph words is then provided from block 340 to block 344. Block 344 then determines all possible candidates for the letters "a" and "I", from the category of glyph words containing only a single letter. Since the "I" and the "a" are the only English words which generally appear as one letter words (excluding the ampersand "&" which is readily identified by the fact that it includes double captured white), each glyph appearing as a one letter word and not including double captured white, is tentatively determined to be either an "a" or an "I".

The output of block 344 is then transmitted to block 348. Block 348 then performs leading digraph analysis on all words containing more than three glyph letters. Leading digraph analysis merely means counting which two letters (in the particular order presented) occur most often as the first two letters in a glyph word. Thus, block 348 determines which two letters are most frequently the first two letters in those glyph words containing more than three letters. For example, the leading digraph for the word "throw" is the glyph pair representing the letters "th". Information as to which digraphs occur most frequently in words containing more than three letters is useful in performing certain cryptographic analysis techniques, including the technique used for determining the word "the", as shall now be described.

In this regard, block 352 identifies the word "the". Since the word "the" is the most commonly used word in the English language, there is a very good likelihood that the word "the" will appear one or more times on a given page of text. Accordingly, block 352 performs certain cryptographic analysis techniques to determine which if any of the glyph words on the page correspond to the English word "the". Obviously, by locating the glyph word corresponding to the word "the", those glyphs corresponding to the letters "t", "h", and "e" are determined.

Figure 11:
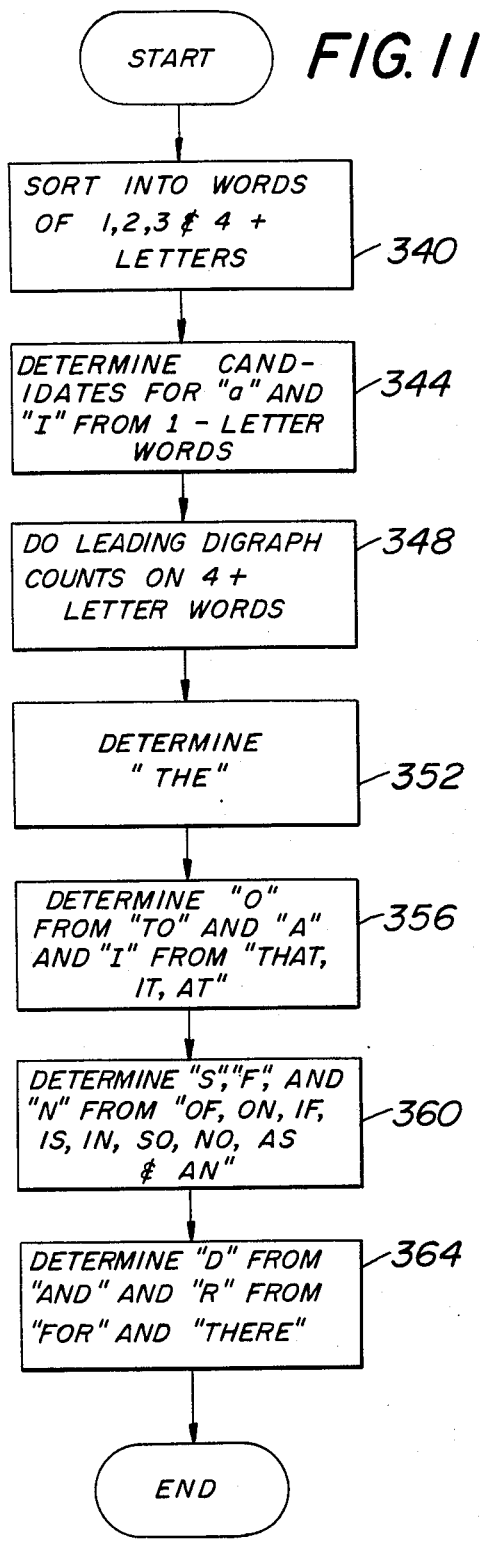
FIG. 11 is a flow chart showing the means used in performing short word analysis, including letter frequency and digraph analysis.
Figure 12:
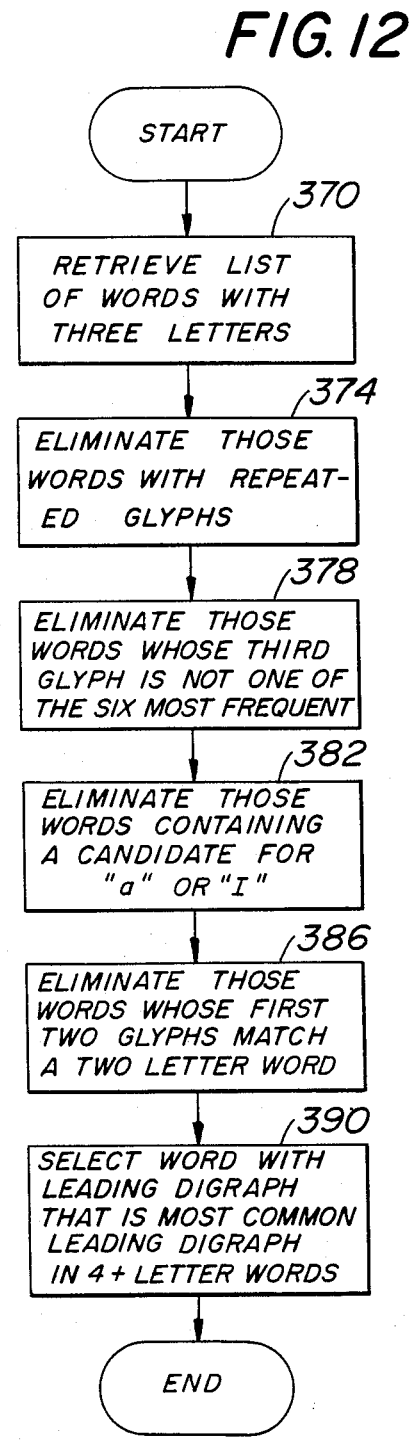
FIG. 12 is a flow chart showing the means used for identifying the word "the"

The determination of the word "the" is set forth in greater detail in the flow diagram shown in FIG. 12. In particular, the first step in determining the word "the" is performed by block 370. Block 370 includes means for retrieving all of the glyph words containing exactly three glyph letters. The next step towards identifying the word "the" is performed by block 374. Block 374 eliminates from consideration all of the three letter words which include a repeated glyph character. Obviously, any word which includes the same glyph more than once, cannot be the word "the". Block 378 then eliminates from consideration all of those words whose third glyph is not one of the six most commonly occurring glyphs on the page. Since the letter "e" is the most frequently occurring letter in the English language, it can safely be assumed that if there are six other glyphs which appear more frequently on the page than the last one in a three glyph letter word, the third glyph in the three glyph letter word does not correspond to the letter "e" and therefore, the glyph word cannot be the word "the". Block 382 then eliminates those glyph words which contain a glyph which is a candidate for either the letter "a" or the letter "I", as determined by block 344 (FIG. 11). Block 386 then further eliminates those words whose first two letters match any two letter word appearing on the page. Obviously, if the first two glyphs in the three letter word appear (in either order) as a two letter word on the page, it may safely be assumed that those two letters are not the letters "t" and "h" and the word is thus, not "the". At this point, if there are still several candidates remaining for the word "the", block 390 makes a determination that the glyph word whose first two letters, (in the order presented) match the most commonly occurring digraph for words containing more than three letters, is the word "the". This conclusion is drawn due to the fact that the digraph "th" is the most frequently occurring digraph in the English language for words containing more than three letters.

It should further be pointed out that system 20 includes additional tests similar to those set forth in FIG. 12 to identify other commonly occurring words.

Referring now to FIG. 11, once block 352 has identified the word "the", the letters "o", "a", and "i" are determined by block 356. In this regard, given the fact that the glyphs for the letters "t" and "h" are known based on the determination made by block 352, the glyph corresponding to the letter "o" may also readily be determined since the only English word containing exactly two glyphs and beginning with the glyph corresponding to the letter "t", is the word "to".

Moreover, block 356 identifies the letter "a" from the word "that", since the glyphs corresponding to the letters "t" and "h" are known and the only letter which can be located between the letters "th" and the letter "t" in a four letter word in the English language is the letter "a". Once the "a" is identified, the "i" may also readily be identified from the word "it", since "it" and "at" are the only two letter words ending with the letter "t".

Block 360 then utilizes similar analysis techniques to identify those glyphs corresponding to the letters "s", "f" and "n". The tests for identifying these letters generally involve an analysis of the following short words: "of", "on", "if", "is", "in", "so", "no", "as" and "an".

Similarly, block 364 identifies those glyphs corresponding to the letters "d" and "r" by analyzing the words "and", "for" and "there".

Figure 13:
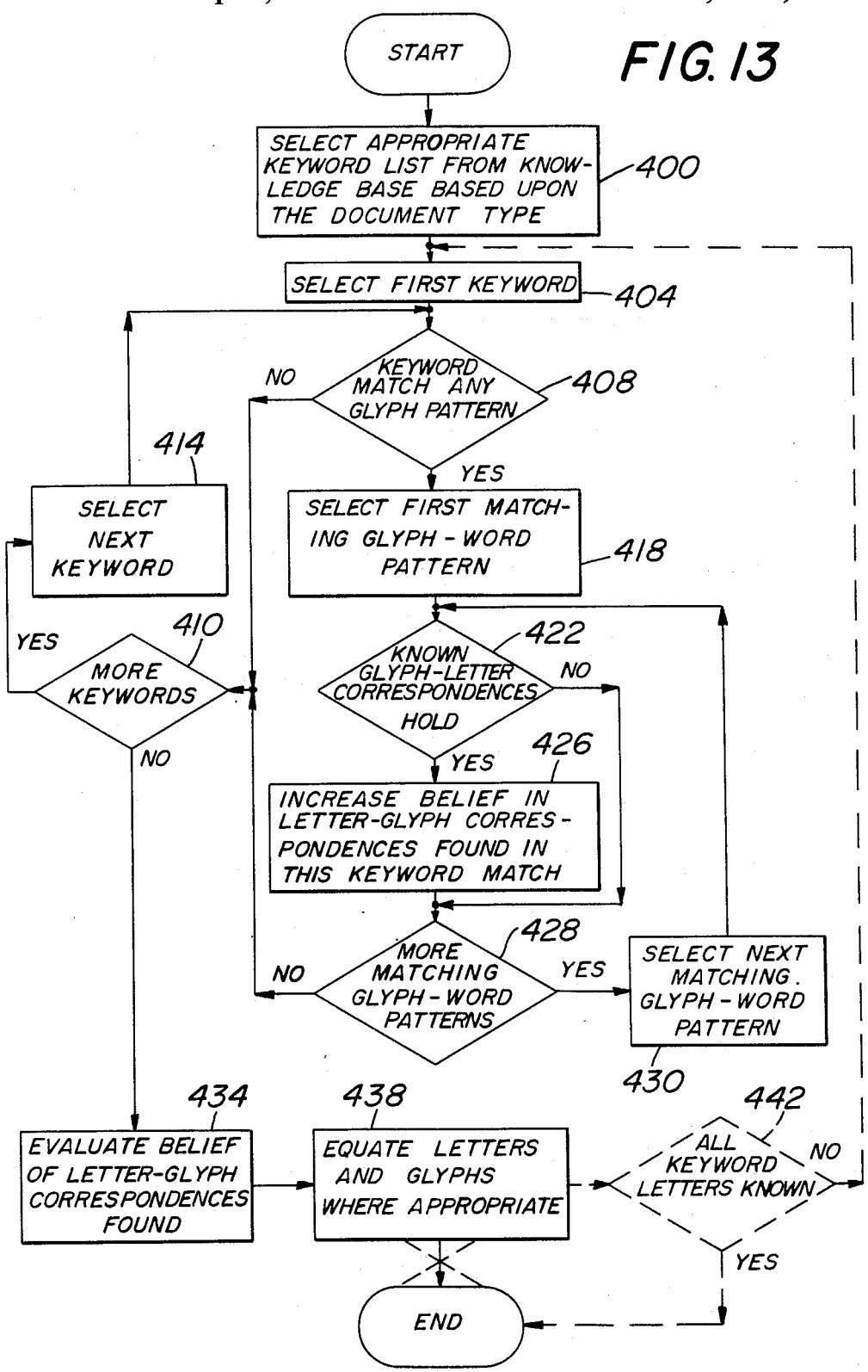
FIG. 13 is a flow chart showing the means used for performing known keyword pattern matching.

Pattern matching using a limited dictionary is performed by block 312, as shown in the flow diagram of FIG. 13. In this regard, the limited dictionary pattern matching routine basically comprises a procedure for identifying certain glyph words on the page by comparing the glyph letter patterns of those glyph words with known letter patterns of commonly occurring words contained in a limited dictionary in tables of the knowledge base. In the preferred embodiment of the invention, the words contained in the limited dictionary number approximately 100 and are selected so as to include the most commonly occurring words in the particular language, e.g., English. The limited dictionary also includes a limited number of additional words obtained from the particular knowledge base based upon document type information obtained from block 28. For example, if block 28 classifies the input page as being that of a financial statement, the limited dictionary would include words such as "Assets" and "Liabilities". Once the appropriate limited dictionary has been selected by block 400, block 404 selects the first keyword in that dictionary, to be compared with the glyph words on the input page of text. Decision block 408 then sequentially compares the letter pattern associated with each glyph word on the page with the letter pattern of the first selected keyword, to determine whether there is a match.

This letter pattern comparison is accomplished by assigning the respective letters of both the dictionary words and the glyph words arbitrary letters beginning with the letter "a". More specifically, the first letter in the word is assigned the letter "a", the next letter in the word, which is not a repeat of a previous letter therein, is assigned the letter "b", and so on, with any repeated letters being assigned the same arbitrary letter originally assigned to that letter when it first appeared. Thus, the pattern for the word "assets" is "abbcdb" and the pattern for the word "liabilities" is "abcdbabebfg". Similarly, each glyph word on a page is also arbitrarily assigned letters in precisely the same manner, beginning with the letter "a". Therefore, the first step in the matching process involves a comparison between the letter patterns assigned to the selected keyword with the letter pattern assigned to each of the glyph words appearing on the page. If there is a match between the letter pattern of the selected keyword and that of a glyph word appearing on the page, a possible letter/glyph match is recognized. If none of the glyph words on the page have the same pattern as the selected keyword, a determination is made that the keyword does not appear on the page. To that end, if no match is indicated by decision block 408, this information is provided to decision block 410 which then determines whether there are any more keywords which have not yet been selected for comparison. If there are additional keywords which have not yet been selected, the next keyword in the limited dictionary is selected by block 414 and the system loops back to decision block 408. Block 408 then determines whether the pattern associated with this next selected keyword matches any of the glyph word patterns appearing on the page. This procedure continues until block 408 determines that there are one or several glyph words appearing on the page whose letter patterns match the currently selected keyword. When this happens, block 418 selects the first glyph word which contains a matching pattern, from among the list of all those glyph words containing a matching pattern. Decision block 422 then determines whether any of the glyph letters in the selected glyph word have previously been determined using one of the previously completed decryption routines, e.g., short word analysis.

If one or several of the glyph letters have already been determined, block 422 then determines whether any of the previously determined glyph/letter correspondences are contradicted by comparing the glyph word (including its known glyph/letter correspondences) to the selected dictionary word. For example, if a previous decryption routine had identified the glyph corresponding to the letter "s", then the glyph word "attest" will fail to match the keyword "assets", even though both of these words have the same letter pattern, namely the pattern "abbcdb". However, if the known glyph/letter correspondences do hold, i.e., are not contradicted, this information is provided to block 426 which establishes a tentative correspondence between the corresponding glyphs in the glyph word and the letters in the selected dictionary word, as will be described later. Decision block 428 then determines whether there are any additional glyph words whose letter patterns match the patterns contained in the selected dictionary word. If there are such additional words, block 430 then selects the next glyph word whose pattern matches the pattern of the dictionary word and the system loops back to block 422 for it to again determine whether the known glyph/letter correspondences are contradicted if this next glyph word were assumed to be the selected word. On the other hand, if there are no other matching word patterns, as determined by decision block 428, decision block 410 again determines whether there are any additional keywords which have not yet been compared with the glyph words on the page. If there are additional keywords in the limited dictionary which have not yet been compared to the glyph words on the page, the next keyword is selected by block 414 and the pattern matching process is repeated, beginning with block 408.

If the known glyph/letter correspondences do hold, decision block 422 provides this information to block 426, which increases the belief that there is in fact a correspondence between the letters in the keyword and the glyphs in the glyph word. It should be remembered however, that the increased belief in letter/glyph correspondences, as established by block 426, is not an absolute determination that the glyphs in the glyph word correspond to associated letters in the selected dictionary word. Rather, block 426 establishes a cross-reference matrix as a means for effecting a weighted determination as to the likelihood that a particular letter/glyph correspondence is, in fact, correct. The cross-reference matrix is formed by including a column of glyphs arranged along one axis (e.g., the Y axis) and a row of characters arranged along another axis (e.g., the X axis). Thus, the value of any element in the matrix (the term element being used herein in its mathematical sense to denote any x,y position in the matrix) is a value associated with the amount of correspondence suggested between the character and glyph whose column and row, respectively, intersect at that element. To that end, the value of all elements in the matrix is initialized at zero when the limited dictionary matching routine begins. However, whenever block 422 determines that a matching glyph/word letter pattern does not contradict previously known glyph/letter correspondences, block 426 increments by one the element in the matrix corresponding to the intersection of the particular glyph's row and the letter's column, for each letter in the dictionary word believed to match a glyph in the glyph word. In this regard, each time that both block 408 determines that a selected dictionary word matches a particular glyph word and block 422 determines that none of the previously known (i.e., known from prior decryption routines) glyph/letter correspondences are contradicted, block 426 increments the value of those elements in the matrix corresponding to the intersection of each letter's column and its associated glyph's row, for each glyph/letter correspondence contained in the matching words.

This loop continues until decision block 410 has determined that all of the keywords in the limited dictionary have been compared to all of the glyph words on the page, at which point block 434 evaluates the information contained in the cross-reference matrix produced by block 426. Since the values of the various elements in the cross-reference matrix correspond to how many pieces of evidence have been obtained suggesting that a particular glyph corresponds to a particular letter, the preferred embodiment of the invention employs an evaluation scheme which entails first locating the highest value element in the matrix and then assuming that the letter and glyph corresponding to that element are equivalent. Once this determination is made, both the row and column of the matrix associated with the particular glyph and letter, respectively (i.e., the row and column intersecting at that element), are cleared, i.e., all elements located along that row and column are changed to the value zero. After the values for that row and column have been set to zero, the new highest value element in the matrix is located. The letter and glyph corresponding to the element having the new highest value are then assumed to correspond to each other and that row and column, respectively, are both set to zero. This process continues until all of the rows and columns in the matrix have been cleared. It should be noted at this point, that although this procedure provides a substantially accurate determination as to letter/glyph correspondences, some errors may occasionally occur. If so, the errors are rectified during subsequent processing of the glyphs by selected ones of the various other routines 308-316 as shown in FIG. 10B.

An alternative embodiment of the invention utilizes a more sophisticated scheme for "solving" the cross-reference matrix. This more sophisticated scheme involves a restricted functioning of block 438 plus the use of an optional decision block 442 (to be described later and shown in the drawing by broken lines). In this more sophisticated scheme block 438 only equates letters with glyphs where the element value of the matrix position associated with such correspondences, exceeds some predetermined value "n". If, at some point, the highest value element in the matrix, as determined by block 434, is less than the value "n", those letters/glyph correspondences whose value is less than "n" are not equated to each other by block 438. Block 442 then determines whether all of the glyphs in the matrix have been identified. If not, block 442 provides this information back to block 404 and the entire limited pattern matching routine is repeated using the letter/glyph correspondences already determined to be valid by block 438. This multiple pass routine continues until decision block 442 has determined that either all of the letter/glyph correspondences have been determined or alternatively, that no additional letter/glyph correspondences have been determined during the previous pass through the loop.

Once all of the keyword letters have either been determined or no additional information is obtained during the previous pass through block 434, the limited dictionary pattern matching routine is deemed complete and is terminated.

Figure 14:
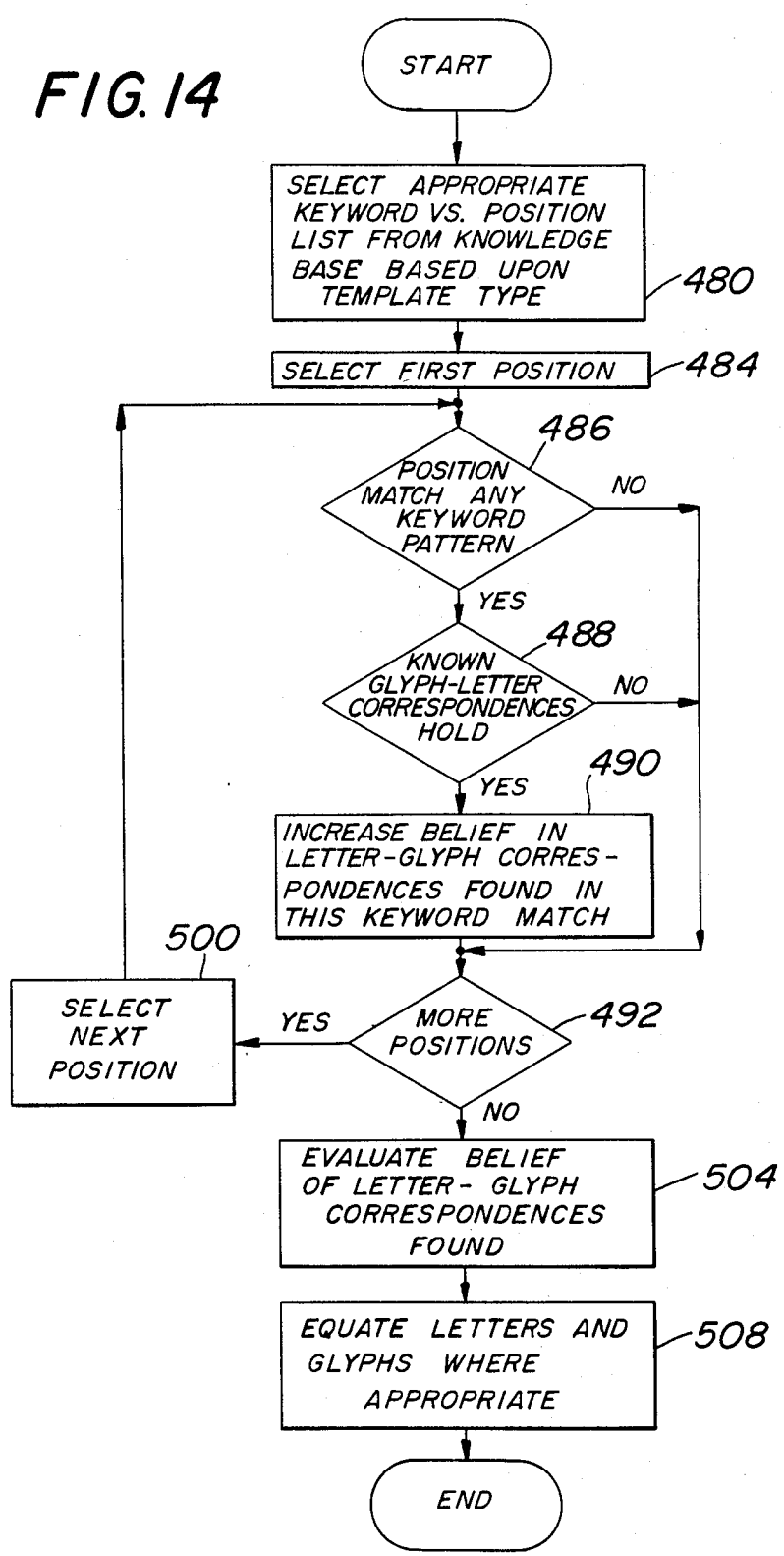
FIG. 14 is a flow chart showing the means used for performing geography-specific, keyword look-up analysis.

The geography specific keyword routine 308 of FIG. 10C, is used where the input page is classified by the document type analysis means 28 as being that of a particular type of document. In this regard, the geography-specific keyword look-up procedure is shown in greater detail in the flow chart of FIG. 14. To that end, block 480 selects an appropriate geography-specific keyword list containing approximately three to twenty keywords, depending upon the document type involved. The keyword list is in tables in the knowledge base and includes those words which are likely to occur at certain predetermined geographic positions on the page of a particular type of document. For example, assuming that the document is a business letter, as noted earlier, it is expected that a letter pattern corresponding to either the words "Sincerely" or "Respectfully yours", will appear towards the bottom right hand side of the page. Another example of the keyword look-up procedure is to look for the word "ASSETS" or "LIABILITIES" at certain locations on a document known to be a financial balance sheet.

Once block 480 has selected the appropriate keyword list from the knowledge base, the next step, as performed by block 484, is to select the first geographic position on the page (e.g., the upper left hand corner), for evaluation. Block 486 then determines whether the first selected geographic position on the page includes a glyph word or a block of glyph words whose letter patterns match the letter patterns of any of the keywords in the selected keyword list. If there is such a pattern match, decision block 486 provides this information to decision block 488. Block 488 then determines whether any of the already determined glyph/letter correspondences do not hold (are contradicted), by assuming that the glyph word matches the keyword. If the previously determined glyph/letter correspondences are not contradicted, an increased belief is formed that the letters and glyphs in the respective words correspond. This increased belief is formed by block 490, by establishing a cross-reference matrix, identical to the cross-reference matrix established by block 426 (FIG. 13) described heretofore. Thus, the matrix established by block 490 is initialized at zero and its elements are incremented in precisely the same manner as discussed above with respect to the matrix established by block 426. Once block 490 increments the element locations in the matrix corresponding to tentatively assumed correspondences, decision block 492 determines whether there are any additional geographic page locations which have not yet been processed i.e., compared with the selected keywords. If there are additional geographic locations which have not yet been processed, the next geographic location on the page is selected by block 500. Once this next position has been selected by block 500, the process of comparing the selected position with selected keyword patterns is repeated starting with block 486. Still further, block 490 then increments the element in the cross-reference matrix corresponding to each letter in the selected word which appears to correspond to a glyph in the glyph word, in the same manner as described above. However, should decision block 486 at some point determine that the glyphs in a particular geographic location do not match any of the keyword patterns, or alternatively, should block 488 at some point determine that the previously determined glyph/letter correspondences are contradicted by equating a particular glyph word with a certain keyword, the operation performed by block 490 is by-passed and block 492 again determines whether there are any other geographic positions on the page which have not yet been processed. This loop continues until block 492 determines that all of the geographic positions have been processed.

Once all the geographic positions have been processed, block 504 evaluates the cross-reference matrix in the same manner as done by block 434 (FIG. 13) during the limited dictionary pattern matching routine described heretofore. It should be pointed out however, that since the domain of the comparison for the geography specific keyword look-ups is quite restricted, there is little chance of error occurring when solving the cross-reference matrix. Accordingly, a single pass through the matrix is almost always sufficient. In other words, it is not necessary to first solve for the most commonly occurring glyph/letter correspondences as is done in the alternative embodiment of the limited pattern dictionary matching procedure of FIG. 13, i.e., the entire matrix may be solved during a single pass. The final step in the geography specific keyword look-up process is performed by block 508. Block 508 equates all of the glyphs which can safely be assumed to correspond to particular letters by assigning those glyphs respective memory pointers to their corresponding letters. Thus, those glyphs which are equated to letters by block 508 are considered as being known for purposes of subsequent decryption routines.

Figure 15:
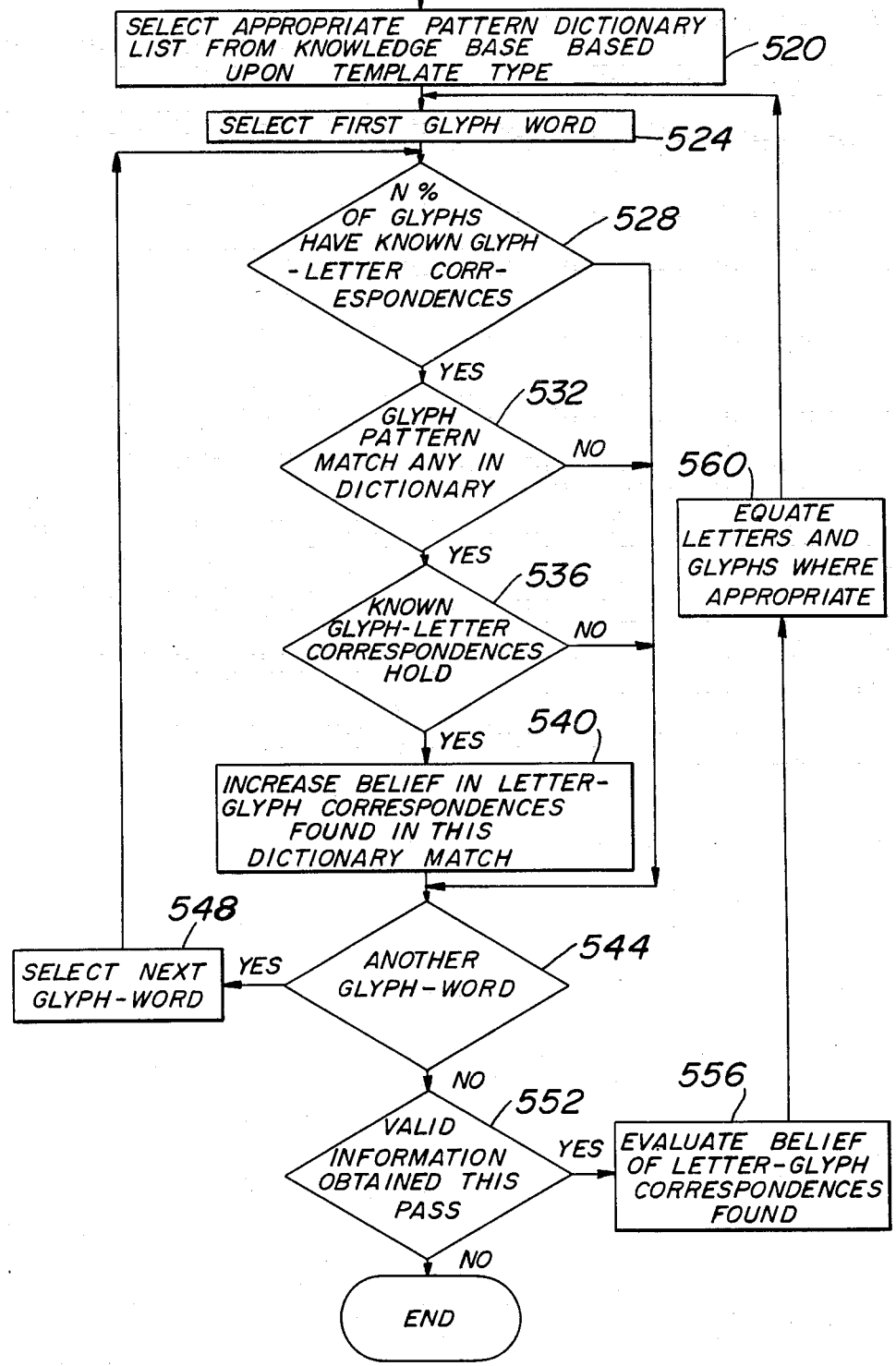
FIG. 15 is a flow chart showing the means used for performing full dictionary pattern matching.

The full dictionary pattern matching routine as performed by block 314 of FIG. 10C, is shown in greater detail in the flow diagram of FIG. 15. In this regard, the full dictionary pattern matching routine is similar, although not identical, to the limited dictionary pattern matching routine described above. The full dictionary pattern matching routine generally uses a list of words co-extensive with all of the words contained in a full dictionary, e.g., Websters Unabridged Dictionary, and thus includes many more words than are contained in the limited dictionary. Block 520 selects an appropriate dictionary, e.g., an unabridged dictionary, and block 524 selects the first glyph word appearing on the input page. Decision block 528 then makes a determination as to whether "n" percent ("n" being some predetermined number, usually around 50) or more of the glyphs in the selected glyph word have known glyph/letter correspondences. If more than, e.g., 50%, of the glyph letters appearing in the glyph word have known glyph/letter correspondences, a determination is made by decision block 532, as to whether any of the words appearing in the full dictionary have a letter pattern which matches the glyph pattern of the glyph word, so as to suggest a possible match therebetween. If one or several of the words in the dictionary includes a letter pattern which matches the pattern of the selected glyph word, decision block 536 determines whether the known glyph/letter correspondences hold. If the correspondences do, in fact, hold this information is entered into a cross-reference matrix established by block 540. The matrix established by block 540 is similar to the cross-reference matracies established by blocks 426 and 492 of FIGS. 13 and 14, respectively. In particular the matrix established by block 540 is initialized at zero and is incremented in the same manner as the matrices described above, whenever an apparent glyph/letter correspondence is encountered. Accordingly, the cross-reference matrix established by block 540 and the method of evaluation thereof will not be described in detail herein, since such has already been described in considerable detail with respect to the other matrices.

After matrix 540 is established and evaluated decision block 544 then determines whether there are any other glyph words on the page which have not yet been compared to the words listed in the full dictionary. If there are glyph words which have not yet been compared to the words listed in the full dictionary, block 548 selects the next glyph word to be compared. This next glyph word is then processed by blocks 528, 532, etc., as described above. If at some point should either block 528 determine that fewer than "n" percent of the glyphs in a selected glyph word are known, or should block 532 determine that the glyph pattern of the selected glyph word does not match any of the patterns in the dictionary, or should block 536 determine that the known glyph/letter correspondences do not hold, the operation performed by block 540 is by-passed. Block 544 then determines whether there are any other glyph words on the page which have not yet been analyzed.

Once all of the words on the page have been analyzed, as determined by block 544, decision block 552 determines whether any valid information was obtained during the previous pass. If some valid information had been obtained during the previous pass, block 556 evaluates the cross-reference matrix established by block 540 to determine whether any additional letter/glyph correspondences may be determined in light of this information. Block 560 then equates the corresponding letters and glyphs to each other, where appropriate. Once the letter/glyph correspondences have been equated to each other by block 560, the full dictionary pattern matching routine is repeated, starting with block 524, but now including the newly determined glyph/letter correspondences as being known correspondences. This loop continues until such time that decision block 55 determines that no additional valid information has been obtained during the previous pass through the loop, at which point the full dictionary pattern matching routine is deemed complete and is terminated.

In certain types of documents, e.g., financial reports, there is likely to be a large quantity of numbers. Thus, where the document type analysis means 28 (FIG. 10C) has determined that the input page constitutes a portion of a financial report, the decryption scheme selected by block 28 includes block 316. Block 316 performs cryptarithm analysis on the glyph numbers to identify the computer readable digits corresponding thereto. In that regard, the cryptarithm analysis means employs various techniques which use certain types of contextual information or "tricks" to extract information likely to lead to the identifiation of digits or numbers, corresponding to glyph numbers. This information is often obtained through the analysis of mathematical relationships among glyph numbers appearing in equations, columns, etc., or from glyph numbers which are used in a specialized way which suggests their value.

Figure 16:
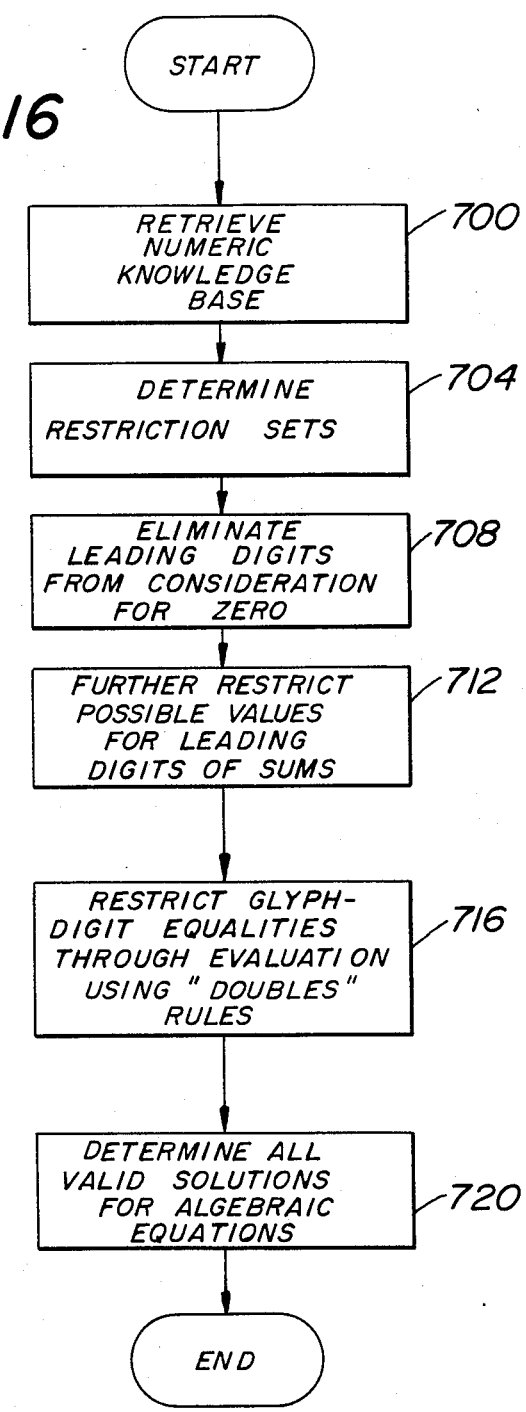
FIG. 16 is a flow chart showing the means used for performing cryptarithmic analysis.

The performance of the cryptarithm analysis is shown in the flow chart of FIG. 16. Thus, as can be seen therein block 700 retrieves the numeric table information from the system's knowledge base. Thereafter block 704 (to be described later) determines various "restriction sets" (to be described later) which are to be applied and block 708, (to be described later) then determines which glyphs should be removed from consideration as being the digit zero. Thereafter block 712, (to be described later) further restricts the possible values for leading digits of sums of glyph numbers. After that action block 716 (to be described later) restricts glyph/digit equalities through an evaluation based on what is referred to as "doubles rules". Finally block 720 (to be described later) determines glyph values based on solutions to algebraic equations.

Before describing the details of the functional blocks 700-720 it should first be pointed out that block 700 obtains as an input, information relating to groups of glyphs which are believed to represent numbers or digits. In this regard, those glyphs which are not able to be decrypted using the various cryptographic techniques described heretofore are suspected to be numbers.

Operation of blocks 700-720 is as follows: after operation of block 700 as just described, block 704 selects various "restriction sets" which are used or applied to the glyph numbers to limit their possible corresponding values. By "restriction sets", it is meant those digit values which may correspond to a particular glyph. For instance, where a previous decryption routine, e.g., the geography specific keyword look-up routine 308, has identified a group of glyphs in a financial report or business letter as being a date, e.g., "December $g_1g_2$, $g_3g_4g_5g_6$", (where $g_n$ represents a digit glyph) it can be inferred that glyph $g_1$ is either the digit "1", "2" or "3" and therefore, its restriction set includes only the digits "1", "2" and "3". Similarly, the restriction set for the glyph "$g_3$" is a single digit, namely the digit "1", since the first number in the year of a balance sheet or business letter may safely be assumed to be the number "1".

Block 704 also forms a cryptarithm cross-reference matrix. The cryptarithm cross-reference matrix is formed by arranging glyph numbers along one axis, e.g., the Y axis, and numbers or digits along another axis, e.g., the X axis. In this regard, the value of any element in the matrix (i.e., an (X,Y) position) corresponding to the intersection of a particular glyph's row and a digit's column, is either the value negative one ($-1$), zero or plus one ($+1$), depending upon whether or not the particular digit is contained in certain restriction sets. In particular each element in the matrix corresponding to the intersection of a glyph's row and a digit's column, is assigned the value $-1$ if the particular digit is not contained in all of said glyph's restriction sets. Thus, the value $-1$ indicates that a particular glyph definitely does not correspond to a certain digit. On the other hand, if a certain digit is in all of a particular glyph's restriction sets, the value of the matrix element which intersects the glyph's row and the digit's column, is assigned either the value zero or the value $+1$ based on the following considerations: If the digit is in all restriction sets of the particular glyph, and also, is the only digit which is in all of the restrictions sets of that glyph, the corresponding matrix element is assigned the value $+1$. If however, more than one digit is contained in all of the restriction sets of a particular glyph, the value of the matrix element corresponding to that particular glyph and digit is zero. Furthermore, the positions in the matrix corresponding to that glyph and the other digits which are also in all of that glyph's restriction sets, are also assigned the value zero. Thus, it should readily be appreciated that a $-1$ indicates that a glyph does not equal a particular digit, a $+1$ indicates that a glyph equals a particular digit, and a zero indicates that a glyph might equal a particular digit.

With respect to those glyph numbers whose corresponding digits still have not been determined after the above mentioned restriction sets have all been loaded into the cross-reference matrix, further processing is performed. This further processing is performed by blocks 708, 712, 716, and 720, each of which derives additional restriction sets, which sets are then loaded into the cross-reference matrix to eliminate all but one of the zeros contained in a particular glyph's row. The last remaining zero is then assigned the value $+1$, to indicate that it is the only digit which appears in all of the restriction sets of the particular glyph and, thus, must correspond to that glyph.

Moreover, block 708 establishes additional restriction sets by eliminating the leading digits in glyph numbers from consideration as possible candidates for the digit zero, since by convention, numbers are not normally written containing leading zeros. It should be pointed out however, that if through previous restriction set analysis, the glyph corresponding to the digit zero has been determined, the analysis as performed by block 708 is omitted. Thus, the result of this analysis is that a restriction set is established for each leading glyph, wherein each of these restriction sets includes all digits but for the digit zero. These restriction sets are then loaded into the cross-reference matrix, as described above. Accordingly, those elements in the matrix which intersect the column corresponding to the digit zero are assigned the value $-1$ if their intersecting row corresponds to a "leading" glyph.

Additional restriction sets are established by block 712. Thus block 712 uses a rule of arithmetic to provide additional restriction sets. That rule is that where a sum of plural numbers added together has "n" digits and none of the addends has as many as "n" digits, the restriction set for the leading digit of the sum is composed of all digits whose value is less than or equal to "m", where "m" is the number of addends having "n minus one" digits. Moreover, if one or more of the addends has "n" digits, then the restriction set for the leading digit of the sum is composed of all digits greater than or equal to "m", where "m" is the number of addends containing "n" digits. If only one glyph number is a leading digit of one or more of the addends containing "n" digits, then "m" is unchanged. On the other hand, if the number of leading glyphs is two, then "m" is replaced with "m+1" and if the number of glyphs is three, then "m" is replaced with "m+3". Furthermore, it is not possible for the number of glyphs which are leading digits in one or more addends containing "n" digits, to be greater than three. Therefore, block 712 calculates restriction sets for leading glyphs of each equation based on this rule and loads these restriction sets into the cross-reference matrix established by block 704, thus further restricting the possible correspondences between glyph numbers and digits. Thus, by loading these additional restriction sets into the cross-reference matrix, some of the glyph numbers whose associated matrix value corresponding to one or several particular digits was zero, may be changed either to $-1$ or to $+1$, depending upon the particular information contained in these restriction sets.

Block 716 establishes still additional restriction sets through the use of what shall be referred to as "doubles rules". The doubles rules are predicated upon the fact that if one of two addend digits in a column matches the sum digit in that same column, then the other addend digit in that column can only be the digit zero or the digit nine. Furthermore, if the column is the rightmost digit (e.g., the one's column), then the restriction set can only contain the digit zero. Still further, if neither of the two addends in the rightmost column matches the sum, then neither one of them can be equal to zero. Thus, using these algorithms or rules of arithmetic, additional restriction sets are produced and are loaded into the cross-reference matrix, in the same manner as described above. It should also be realized that for subtraction equations, these rules can similarly be applied by recognizing the fact that, if for example, $c-b=a$, then $a+b$ must equal c. By performing this simple transformation, a subtraction equation can be analyzed as though it were an addition equation, thus enabling the doubles rules to be applied to the subtraction equation.

If after all of the above mentioned restriction sets have been entered into the cross-reference matrix, there are still some digits whose values have not been determined, block 720 solves for the remaining unsolved digits through the use of additional restriction sets, established by analyzing algebraic relationships among numbers on the page. In this regard, the functional steps used in determining valid solutions to algebraic equations, as performed by block 720 is shown in greater detail in the flow chart of FIG. 17.

Figure 17:
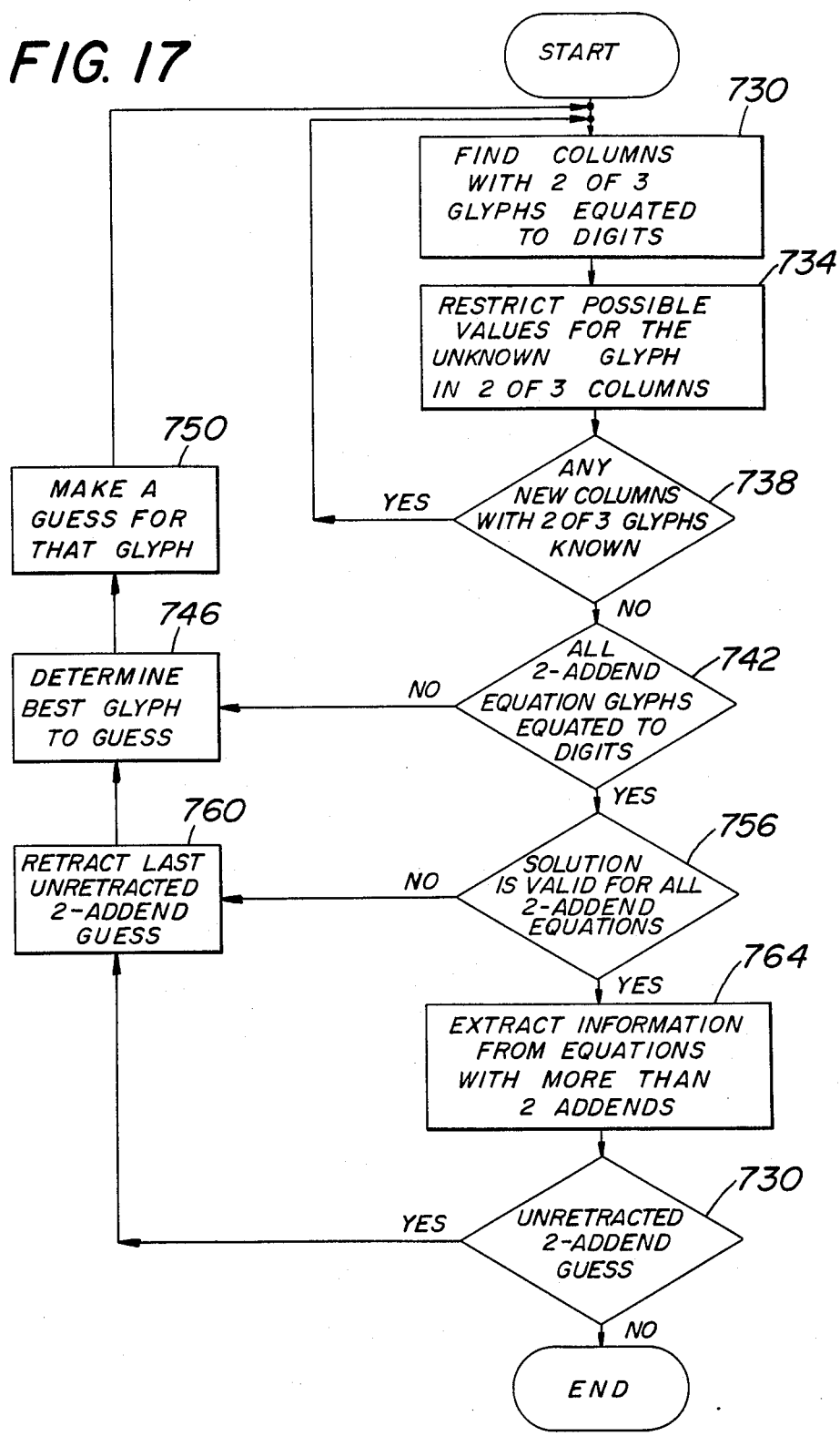
FIG. 17 is a flow chart showing the means used for determining valid solutions to algebraic equations.

As can be seen in FIG. 17 in order to determine valid solutions to algebraic equations, block 730 first locates all of the columns on the input page which comprise two addends and their sum, i.e., a two addend equation. Of those columns, block 730 further locates the particular columns in which two of the three glyphs (either the two addend glyphs or an addend glyph and a sum glyph) have been determined to correspond to particular respective digits. Block 734 then restricts the possible values for the unknown glyph in each of said columns through the use of simple mathematical computation. In that regard, if two glyphs in a column comprising a two addend equation is known, then the restriction set which is derived for the third glyph in that column contains at most two digits. Moreover, if it is definitely known whether there is a carry into the particular column, then the restriction set for the unknown glyph will consist of only a single digit.

Block 734 then loads the additional restriction sets obtained through the above mentioned analysis into the cross-reference matrix and thereafter decision block 738 determines whether there are any other columns in which two of the three glyphs are known. If block 738 determines that there are additional columns where two of the three glyphs are known, this information is provided back to block 730 and the procedure performed by block 734 as described above is repeated for that column, thus producing additional restriction sets in the same manner as described above. However, if block 738 determines that there are no additional columns in which two of the three glyphs are known, then decision block 742 determines whether all of the glyphs contained in the two addend equations have been determined, i.e., have been equated to digits. If block 742 determines that not all of the glyphs contained in two addend equations have been equated to digits, block 746 determines that the value for a selected one of said glyphs should be guessed. The glyph whose value should be guessed i.e., the best glyph to guess, is the glyph which is "most restricted". The "most restricted" glyph is the one whose row in the cross-reference matrix has the fewest zeros. If two or more of the glyphs are equally restricted, then block 746 selects the glyph which is in the greatest number of columns of those two addend equations which contain exactly one glyph equated to a digit since that glyph has the highest derivable information content. If two or more glyphs are equal in this regard then one is chosen at random.

Block 750 then guesses a value for the selected glyph. The guess is made based on the selection of the lowest digit which is contained in every one of the glyph's restriction sets. The digit guessed is stored so that the cross-reference matrix can be reinstated to its previous condition should the guess later be "retracted", as shall be described later. Once the guess has been made by block 750, the above described analysis is repeated beginning with block 730 and including blocks 734, 738 and 742, as previously described.

If block 742 at some point determines that all of the glyphs in the two addend equations have been equated to digits, this information is provided to decision block 756 which determines whether these values provide valid solutions for all two addend equations on the page. If a determination is made by block 756 that the solutions are not valid for all the two addend equations, then the last made unretracted two addend guess is retracted by block 760. In this regard, a guess is deemed "unretracted" when its restriction sets have been and still remain loaded in the cross-reference matrix. Conversely, a "retracted" guess is a prior guess which has since been removed, i.e., the restriction sets produced from that guess have been deleted, with the cross-reference matrix having been restored to the state it was in prior to when the guess was made.

Accordingly, block 760 retracts the last unretracted two addend guess by restoring the cross-reference matrix to the state it was in prior to the most recent guess having been made by block 750. Block 746 then determines the best glyph to guess (as described heretofore), block 750 makes another guess for that selected glyph and blocks 730, 734, etc., repeat the procedure for solving the equations, using this new information. This loop continues until decision block 756 determines that the solution is in fact valid for all two addend equations. At that point, this information is provided to block 764 which extracts information from equations having more than two addends. The process of extracting information from equations having more than two addends shall be described later. Once such information is extracted by block 764, decision block 770 determines whether there are any other unretracted two addend guesses which can be made. In other words, block 770 selects another value to guess for the selected glyph, namely one not previously tried, to see if it too would yield a valid solution. If all of the remaining digits in all of the particular glyph's restriction sets have previously been retracted, the procedure shown in FIG. 17 is complete. On the other hand, if there are other unretracted two addend guesses which can be made, block 760 records the previously determined valid solutions in a temporary buffer and then retracts the last unretracted two addend guess. Block 746 then determines the best glyph to guess, excluding those which have already been retracted. Block 750 then makes a guess for that glyph and the procedure performed by blocks 730, 734, etc., is repeated. This loop continues until such time that block 770 determines that there are no additional unretracted two addend guesses remaining.

Figure 18:
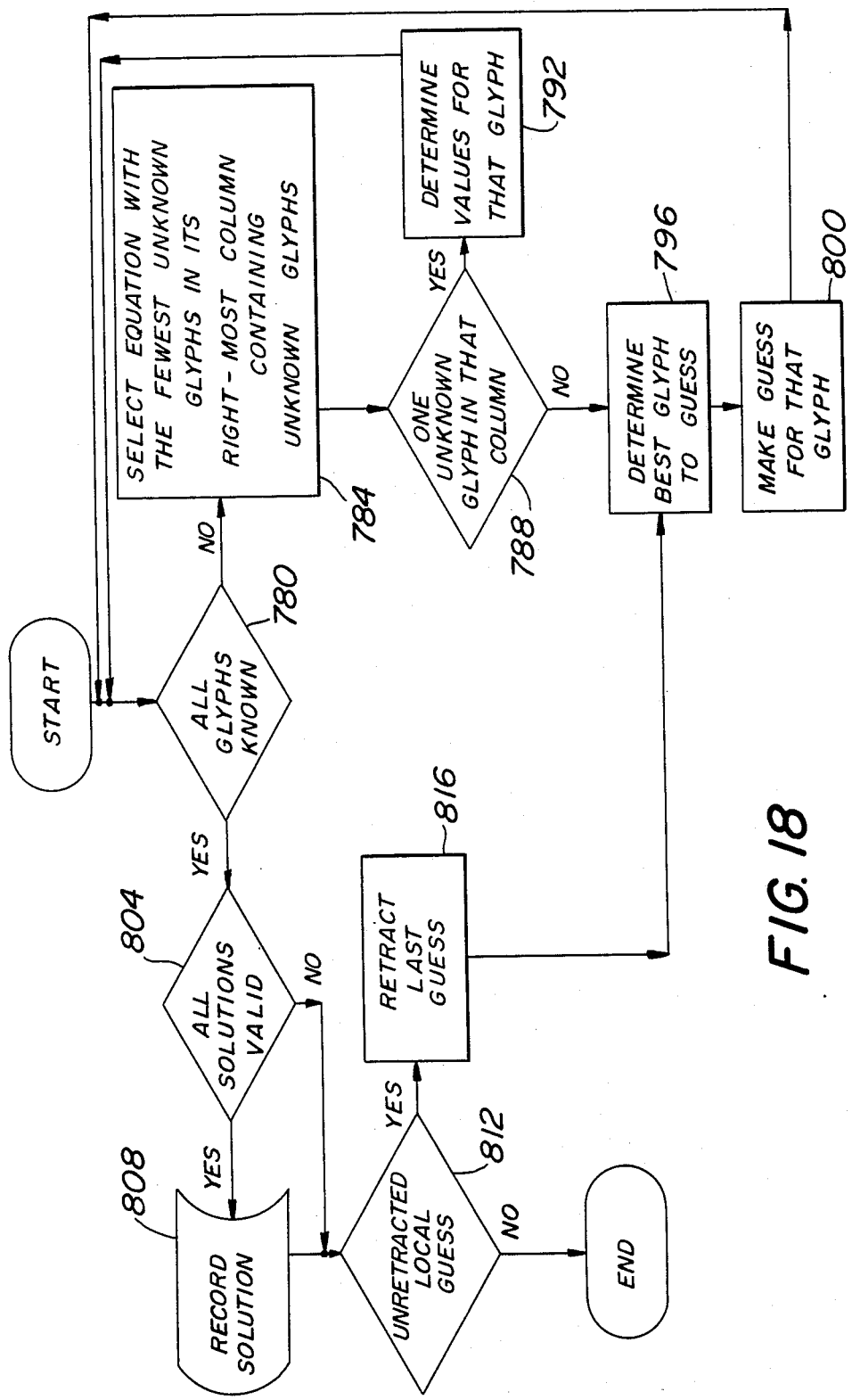
FIG. 18 is a flow chart showing the means used for extracting information from equations having more than two addends.

The procedure for extracting information from an equation having more than two addends, as performed by block 764, is shown in greater detail in the flow chart of FIG. 18. In this regard, the first step towards extracting information from equations having more than two addends is performed by decision block 780. Thus, block 780 determines whether all of the glyphs are known. If all of the glyphs are not known, this information is provided to block 784. Block 784 then selects the equation having the fewest unknowns in its rightmost column. In this regard, the columns of every equation having more than two addends are checked from right to left until a column is found for each equation which contains unknown glyphs. The column with the fewest unknown glyphs is selected since that column is the one having the highest information content and, thus, may be solved most easily.

The decision block 788 then determines whether any of those equations include only one unknown glyph. If there is a column containing only one unknown glyph, block 792 produces a restriction set containing all possible values for that glyph. Moreover, the unknown glyph is equated to a singly digit since the carry value for the column is known. In this connection since the column with the single unknown glyph is the rightmost of those columns containing unknown glyphs, if there is a column to the right thereof its carry value is calculated by solving the equation defined by the column(s) to the right of the column with the unknown glyph. If the rightmost column having the single unknown glyph is the absolute rightmost column, i.e., the "ones" column, then the carry value thereof is zero and the value of the unknown glyph is calculated by solving the equation of that column.

Once block 792 has determined the value for the unknown glyph, block 780 again determines whether all of the glyphs are known. If all glyphs are not known the procedure for selecting the equation having the fewest unknown glyphs is repeated by block 784 for another glyph, thus continuing the loop. If, on the other hand, decision block 788 determines that there is more than one unknown glyph in the selected column this information is provided to block 796. Block 796 then determines which glyph is the best one to attempt to guess its value.

The best glyph whose value is to be guessed is the glyph which is most restricted, i.e., the one whose row in the cross-reference matrix has the fewest zeros. If two or more of the glyphs in the selected column are equally restricted, then one is chosen at random.

Once the glyph to be guessed is selected by block 796, block 800 makes a guess at that glyph. The guess is made by choosing the lowest value digits contained in all of the glyph's restriction sets. The loop is then repeated beginning with block 780, which again determinines whether all of the glyphs are known. If all are not known, the above described routine or loop continues beginning with block 784. If, however, at any point during this loop, block 780 determines that all of the glyphs have been equated to digits, i.e., are known, this information is provided to decision block 804. Block 804 then makes a determination as to whether all of the solutions to the equations are valid. This determination is made in the same manner as described earlier, namely, by determining whether the known digits provide valid arithmetic results when substituted for their corresponding glyphs in the equations provided.

If all of the arithmetic solutions are valid, then the glyph value information as provided by block 804 is recorded in buffer 808 for later processing. Notwithstanding the fact that block 803 has found a set of valid solutions for the unknown glyphs, there may be another set or sets of valid solutions. Therefore, decision block 812 determines whether any of the guesses made during the processing of equations having more than two addends (such guesses being referred to as "local" guesses) and which provided valid solutions have not been retracted by block 816. If there are any unretracted guesses, then block 816 retracts the last guess. Block 796 then determines the best glyph to guess its value and operation continues as described heretofore.

If decision block 804 determines that the solutions are not all valid the invalid solutions are not recorded and block 812 again determines whether there are any unretracted local guesses. In either event, if all of the local guesses have not been retracted, block 816 then retracts the last local guess made and block 796 operates to determine the best glyph to guess its value, whereupon operation continues as described heretofore.

When all the local guesses have been retracted (as determined by block 812), the procedure shown in FIG. 18 is terminated and a determination is made by decision block 770 (FIG. 17) as to whether there are any remaining unretracted two addend guesses. It should be noted however, that under some circumstances more than one guess could yield valid results. In such an event a restriction set containing all of the possible solutions (as stored in buffer 808) is provided to block 770. This restriction set will generally be further restricted to a single value during further passes through the loops of the routine shown in FIGS. 17 and/or 18.

Once all of the above mentioned cryptarithm routines have been performed, the cross-reference matrix should contain only one +1 value in each digit column, thus indicating the glyph number corresponding to that digit. This information is then used to identify each glyph number appearing on the input page, as corresponding to a particular digit. A machine code representation for each of those glyph numbers is then readily substituted for the number glyphs and included in the machine readable code representation of the page of text. Where there is an insufficient amount of number information in the document to successfully utilize the cryptarithm analysis routines, or as an adjunct to use of the cryptarithm analysis, the system 20 employs an "unbending analysis" routine. The "unbending analysis" routine comprises a procedure of analyzing glyph numbers by representing them as straight line segments. Each segment is formed of the sum total of all of the line segments composing the glyph number. The number/glyph correspondences are then determined by comparing the respective lengths of the sum total unbent line segments of respective number glyphs to each other, since it is known that the unbent length of respective numbers relative to the unbent length of other numbers is generally the same irrespective of the type font and type size. For example, the glyph representing "6" is generally equivalent to the glyph representing "9" and the glyph representing "8" is generally the longest glyph representation. An alternative or adjunctive method of contextual numerical decoding makes use of a histogram of the total black pixel count of comparative glyphs. In addition to the foregoing, conventional shape analysis techniques (e.g., masking) can be utilized.

As should thus be appreciated by those skilled in the art, the recognition system 20 provides an effective means for recognizing textual material and converting that material into machine readable code. In that regard, the system is capable of recognizing an unlimited number of different type fonts, since the recognition process does not primarily depend upon the shape and/or geometry of the characters being read. Accordingly, the system 20 has a wide range of applications for inputting information contained in a wide variety of different types of documents into a computer data base or system.

Without further elaboration, the foregoing will so fully illustrate our invention that others may, by applying current or future knowledge, readily adapt the same for use under various conditions of service.

TABLE 1

CONTEXTUAL STATE TABLES
1.1 - Alphabetic Character Glyph Occurence State
$\Sigma P(Cm) = 100\%$

| Cm<br>P(Cm) | a<br>Pa | b<br>Pb | c<br>Pc | d<br>Pd | e<br>Pe | f<br>Pf | g<br>Pg | h<br>Ph | i<br>Pi | j<br>Pj | k<br>Pk | l<br>Pl | m<br>Pm | n<br>Pn | o<br>Po | p<br>Pp | q<br>Pq | r<br>Pr | s<br>Ps | t<br>Pt | u<br>Pu | v<br>Pv | w<br>Pw | x<br>Px | y<br>Py | z<br>Pz |
|---|---|---|---|---|---|---|---|---|---|---|---|---|---|---|---|---|---|---|---|---|---|---|---|---|---|---|
| English | 8 | 1 | 3 | 4 | 13 | 3 | 1 | 6 | 7 | — | — | 4 | 2 | 7 | 8 | 3 | — | 7 | 6 | 9 | 3 | 1 | 2 | — | 2 | — |
| French | 8 | 1 | 3 | 4 | 18 | 1 | 1 | 1 | 7 | 1 | na | 5 | 3 | 8 | 6 | 3 | 1 | 7 | 7 | 7 | 6 | 2 | na | — | — | — |
| German* | 5 | 3 | 2 | 5 | 18 | 1 | 4 | 4 | 8 | — | 1 | 3 | 3 | 11 | 4 | — | — | 7 | 7 | 5 | 5 | 1 | 2 | — | — | 1 |
| Spanish** | 13 | 1 | 4 | 5 | 13 | 1 | 1 | 1 | 7 | — | na | 5 | 3 | 7 | 9 | 3 | 1 | 7 | 8 | 4 | 4 | 1 | na | — | 1 | — |

TABLE 1-continued
CONTEXTUAL STATE TABLES
1.1 - Alphabetic Character Glyph Occurence State
ΣP(Cm) = 100%

| Cm<br>P(Cm) | a<br>Pa | b<br>Pb | c<br>Pc | d<br>Pd | e<br>Pe | f<br>Pf | g<br>Pg | h<br>Ph | i<br>Pi | j<br>Pj | k<br>Pk | l<br>Pl | m<br>Pm | n<br>Pn | o<br>Po | p<br>Pp | q<br>Pq | r<br>Pr | s<br>Ps | t<br>Pt | u<br>Pu | v<br>Pv | w<br>Pw | x<br>Px | y<br>Py | z<br>Pz |
|---|---|---|---|---|---|---|---|---|---|---|---|---|---|---|---|---|---|---|---|---|---|---|---|---|---|---|
| Italian | 12 | 1 | 5 | 3 | 13 | 1 | 2 | 1 | 11 | na | na | 7 | 3 | 6 | 9 | 3 | — | 6 | 5 | 6 | 3 | 2 | na | na | na | 1 |

Where Cm=alpabetic character glyph; m=a,b,c, ... y,z; and P(Cm)=Percent Probability of character occurence. Separate state tables are derived for beginning, end and within word occurences. (*) German also has 3 umlauts, a,o and u; (**) Spanish also has n, and the two character glyphs ch, ll, and rr.
(na) Not applicable.

1.2 - Contiguous Multi-Character State Tables
1.2.1 - Two Character Digraphic Glyphs & Ligatures
ΣP(Cmm) = 100%

| Cmm | Cma | Cmb | Cmc | Cmd | Cme | — | — | — | Cmy | Cmz |
|---|---|---|---|---|---|---|---|---|---|---|
| Cam | Paa | Pab | Pac | Pad | Pae | — | — | — | Pay | Paz |
| Cbm | Pba | Pbb | Pbc | Pbd | Pbe | — | — | — | Pby | Pbz |
| Ccm | Pca | Pcb | Pcc | Pcd | Pce | — | — | — | Pcy | Pcz |
| — | — | — | — | — | — | — | — | — | — | — |
| — | — | — | — | — | — | — | — | — | — | — |
| Cym | Pya | Pyb | Pyc | Pyd | Pye | — | — | — | Pyy | Pyz |
| Czm | Pza | Pzb | Pzc | Pzd | Pze | — | — | — | Pzy | Pzz |

Where C(mm)=digraphic character glyph; m=a,b,c .. . y,z; and P(Cmm)=Percent Probability of Cmm digraph or doublet, glyph or ligature occurence. Separate state tables derived for beginning, end and within word occurences.
For example, in English digraphic character glyphs with high P(Cmm) probabilities are: (1) Word Beginning Glyphs: "an-", "at-", "be-", "de-", "dr-", "en-", "in-", "no-", "re-", "se-", "th-" and "un-"; (2) Word Ending Glyphs: "-ed", "-en", "-er", "-es", "-is", and "-il"; and (3) Within Word Doublet Glyphs: "-ee-", "-oo-", "-ll-", "-rr-", "-ss-", "-tt-", "-dd-", "-gg-", "-bb-", "-cc-", "-mm-" and "-pp-". In German, "-aa-", "-ee-", "-oo-", "-dd-", "-ff-", "-mm-", "-nn-", "-pp-", "-rr-", or "-ss-" frequently form doublet glyphs; and "-ig", "-ch", "-it" and "-ft" common digraph word ending glyph. In Spanish, "-ll-", "-rr-" and "-cc-" doublet frequently, but "-oo-" or "-nn" rarely. In Italian, words rarely end in consonants, but consonants form doublet glyphs frequently within words, with "-ll-", "-tt-", "-ss-", "-cc-", "-rr", and "-pp-" being the most common.

1.2.2 - Character & Punctuation Symbol
Digraphic Glyphs & Ligatures
ΣP(Cmi) = 100%

| Cmi | Cm. | Cm, | Cm; | Cm: | Cm? | Cm! | Cm" | Cm' | Cm- | Cm/ |
|---|---|---|---|---|---|---|---|---|---|---|
| Cai | Pa. | Pa, | Pa; | Pa: | Pa? | Pa! | Pa" | Pa' | Pa- | Pa/ |
| Cbi | Pb. | Pb, | Pb; | Pb: | Pb? | Pb! | Pb" | Pb' | Pb- | Pb/ |
| Cci | Pc. | Pc, | Pc; | Pc: | Pc? | Pc! | Pc" | Pc' | Pc- | Pc/ |
| — | — | — | — | — | — | — | — | — | — | — |
| — | — | — | — | — | — | — | — | — | — | — |
| Cyi | Py. | Py, | Py; | Py: | Py? | Py! | Py" | Py' | Py- | Py/ |
| Czi | Pz. | Pz, | Pz; | Pz: | Pz? | Pz! | Pz" | Pz' | Pz- | Pz/ |

Where Cmi=character-punctuation digraphic character; m=a,b,c ... y,z; i=".", ",", ";", ":", ... ".", "/"; and P(Cmi)=Percent Probability of Cmi digraphic occurence. Separate state tables derived for C"m beginning, and C'm and C-m within word occurences; and for Cnf and Cnf numeric digit and monetary symbol probabilities, P(Cfn) and P(Cnf), digraph glyphs where n=1,2,3 ... 9, 0, and f=$, , Y, ¢, etc.
For example, in English the C'm digraph glyph has high P(C'm) probabilities for "'s", "'t" or "'d"; likewise, its Cm' counterpart has high probability for "n'". In French, P(Cm') has high probabilities for "c'", "d'", "l'" and "n'", and P(C'm) for "'a", "'e", "'i", "'o" and "'u". In Italian, P(Cm') has high probabilities for "l'" and "d'", and P(C'm) for "'a", "'e", "'i", "'o" and "'u".
For U.S. financials Cfn or Cnf digraphic glyphs, P(C$0), P(C%n) and P(C¢n) are very low. P(C$m), P(Cm%) or P(Cm¢), where m=a,b,c ... y,z, are also extremely low. Similar probability relationships exist in German, French, etc. financial mesages.

1.2.3 - Three Character Trigraphic Glyphs & Ligatures
ΣP(Cmmm) = 100%

| Cmmm | Cmaa | Cmab | Cmac | — | — | — | Cmzy | Cmzz |
|---|---|---|---|---|---|---|---|---|
| Caam | Paaa | Paab | Paac | — | — | — | Pazy | Pazz |
| Cbam | Pbaa | Pbab | Pbac | — | — | — | Pbzy | Pbzz |
| Ccam | Pcaa | Pcab | Pcac | — | — | — | Pczy | Pczz |
| — | — | — | — | — | — | — | — | — |
| — | — | — | — | — | — | — | — | — |
| Cyam | Pyaa | Pyab | Pyac | — | — | — | Pyzy | Pyzz |
| Czam | Pzaa | Pzab | Pzac | — | — | — | Pzzy | Pzzz |

Where C(mmm)=trigraphic glyph character; m=a,b,c ... y,z; and P(Cmmm)=Percent Probability of Cmmm trigraph glyph occurence. Separate state tables are derived for beginning, end and within word occurences.
For example, in English common trigraphic glyphs with high P(Cmmm) probabilities are: (1) Word Beginning Glyphs: "pre-" and "pro-"; and (2) Word Ending Glyphs: "-ant", "-ate", "-ble", "-bly", "-ded", "-ere", "-ese", "-est", "-ess", "-ful", "-ght", "-ine", "-ing", "-ion", "-ist", "-ive", "-lly", "-ous", "-rst", "-ses", and "-sts". In German, frequent word ending P(Cmmm) glyphs are "-ich", "-sch", "-eit", and "-aft". And in Italain, "-are", "-ato", "-ero", "-ere", "-eta", "-eto", "-ini", "-ita", "-ivo", "-oni", "-uto", and "-ure".
For financial Csnn trigraph glyphs involving decimal points, P(C.nn) probability for "0.00" is greater than those for "0.11", "0.21", "0.31" ... "0.89", or "0.99".

1.2.4 - Four Character Quadrigraphic Glyphs & Ligatures
ΣP(Cmmmm) = 100%

Where Cmmm=quadrigraphic glyph character; m=a,b,c ... y,z; and P(Cmmmm)=Percent Probability of Cmmmm quadrigraph glyph occurence. Separate state tables are derived for beginning, end and within word occurences.
For example, in English common quadrigrahic glyphs with high P(Cmmmm) probabilities are the word endings "-ance", "-ment", and "-tion"; in German, the word endings "-isch", "-heit", and "-keit"; and in Italian, the word endings "-aggi", "-alla", "-alle", "-anda", "-ante", "-anno", "-arte", "-atte", "-atto", "-empo", "-ente", "-ento", "-enza", "-iate", "-iale", "-ieta", "-ieto", "-ione", "-ista", "-ollo", "-otto", and "-osso".

We claim:

1. A system for recognizing the content of a communication in symbolic language having rules, said communication comprising a plurality of glyphs arranged in a predetermined order and defining plural glyph words, each of said glyphs being a discrete element generally comprising the smallest meaningful informational unit of said language, said system comprising sensory input means for sensing said plurality of glyphs and inputting a stream of data indicative thereof into storage menas, separating means for separating said data into a plurality of glyphs, compiling means for assigning a unique identifier to each set of substantially identical glyphs, pattern grouping means for arranging said identifiers in a grouped arrangement corresponding to the arrangement of said glyph words in said communication, decryption means including language and dictionary storage means for applying general cryptographic techniques to said identifiers to analyze said grouped identifiers in terms of contextual patterns by their sequences within at least one word and their interrelationships as words, to thereby determine the equivalent symbol of language corresponding to each of said identifiers.

2. The system of claim 1, further comprising assembling means, said assembling means arranging said symbols of language in an arrangement corresponding to the arrangement of said glyphs in said communication to replicate the informational content of said communication.

3. The system of claim 2, further comprising substituting means, said substituting means substituting computer recognizable code for each of said symbols of language making up said communication for use of said communication by computer means.

4. The system of claim 3, wherein said communication comprises a document.

5. The system of claim 4, wherein said sensory input means comprises means for providing a bit-mapped representation of the glyphs appearing in said document.

6. The system of claim 5, wherein said sensory input means comprises means for producing a binary representation of the glyphs appearing on said document.

7. The system of claim 6, wherein said sensory input means comprises a facsimile device.

8. The system of claim 5, wherein said separating means comprises horizontal segmentation means and vertical segmentation means, wherein said horizontal segmentation means breaks said bit-mapped representation of said document into individual lines of text and said vertical segmentation means breaks each of said lines of text into discrete glyphs.

9. The system of claim 8, wherein said separating means includes means for breaking ligatures into their respective component symbols of language.

10. The system of claim 1, wherein said compiling means identifies various physical characteristics of each of said glyphs, to determine which of said glyphs are substantially identical to other glyphs.

11. The system of claim 10, further comprising counting means for determining the number of glyphs contained in each set of substantially identical glyphs.

12. The system of claim 11, wherein said pattern grouping means arranges said identifiers in a plurality of individual sequences, wherein each individual sequence corresponds to a particular word in said language.

13. The system of claim 1, wherein said communication is a document and further comprising document type analysis means, said document type analysis means analyzing glyph patterns and the arrangement of groups of glyphs in said document to determine and classify said document as being that of a particular type.

14. The system of claim 13, wherein said decryption means selects an appropriate set of decryption routines based on classification information supplied by the document type analysis means.

15. The system of claim 14, wherein said decryption means decodes a document, which has been determined by said document type analysis means to contain general textual information, through the use of means for analyzing short words, means for matching a limited dictionary and means for matching a full dictionary.

16. The system of claim 14, wherein said decryption means decodes a document, which has been determined by the document type analysis means to be a business letter, through the use of look-up means based on geography specific keywords, means for analyzing short words, means for matching a limited dictionary pattern and means for matching a full dictionary.

17. The system of claim 14, wherein said decryption means decodes a document, which has been determined by said document type analysis means to be a financial report, through the use of look-up means based on geography specific keywords, means for matching a limited dictionary and cryptarythm analysis means.

18. The system of claim 14, wherein said decryption means includes inconsistency determining means which determines whether the results produced by each of said decryption routines is consistent with the glyph-/symbol correspondences previously determined during other decryption routines.

19. The system of claim 18, wherein said inconsistency determining means analyzes said inconsistencies, removes certain previously established glyph/symbol correspondences and then selects an appropriate decryption routine to be repeated based on said analysis.

20. The system of claim 18, further comprising ambiguity sensing means, whereupon whenever said inconsistency determining means determines that there are no inconsistencies, said ambiguity sensing means determines whether all of said glyphs have been identified and, if not, selects the next decryption routine to be performed.

21. The system of claim 13, wherein said cryptographic means comprises look-up means based on geography specific keywords, said look-up means analyzing the document to determine whether certain preselected glyph patterns appear at certain predetermined locations on said document.

22. The system of claim 1, wherein said decryption means comprises a plurality of analytical means for identifying correspondences between glyphs and symbols of language, without relying to a substantial degree on the shape or geometry of the respective glyphs.

23. The system of claim 1, wherein said decryption means comprises pattern matching means which compares glyph patterns in glyph words with letter patterns in respective keywords selected from a list of keywords.

24. The system of claim 23, wherein said list of keywords includes a limited number of frequently used words.

25. The system of claim 23, wherein said list of keywords comprises a general dictionary of said language.

26. The system of claim 1, wherein said decryption means includes means for analyzing short words for determining correspondences between glyphs and symbols of language, by analyzing interrelationships among glyphs in glyph words containing fewer than five glyph letters.

27. The system of claim 26, wherein the means for analyzing short words utilizes and compares information pertaining to the frequency with which particular glyphs and glyph patterns occur, the frequency at which certain characters and groups of characters occur, respectively, in said language.

28. The system of claim 1, wherein said decryption means further comprises cryptarithm means for identifying those glyphs which correspond to symbols of language comprising digits, said cryptarithm means analyzing the context in which those glyphs occur, including their interrelationship with other glyphs which correspond to digits.

29. The system of claim 28, wherein said cryptarithm means comprises means for establishing restriction sets which limit the possible digit values for those glyphs corresponding to digits.

30. The system of claim 29, wherein said restriction sets are established by eliminating certain glyphs from consideration for being the digit zero.

31. The system of claim 29, wherein said restriction sets are established through the application of arithmetic rules and manipulations to said glyphs corresponding to digits.

32. A method of mechanized recognition of the content of a communication in a symbolic language having rules, said communication comprising a plurality of glyphs arranged in a predetermined order and defining plural glyph words, each of said glyphs being a discrete element generally comprising the smallest meaningful informational unit of said language, wherein said method comprises the steps of storing language and dictionary information for later use, sensing said plurality of glyphs and inputting a stream of data indicative thereof into storage means, separating said data into a plurality of said glyphs, assigning a unique identifier to each set of substantially identical glyphs, arranging said identifiers in a grouped arrangement corresponding to the arrangement of said glyph words in communication and decrypting said identifiers based on said stored language and dictionary information by applying general cryptographic techniques to said identifiers to analyze said grouped identifiers in terms of contextual patterns by their sequences within at least one word and their interrelationships as words, to determine the equivalent symbol of language corresponding to each of said identifiers.

33. The method of claim 32, further comprising the step of arranging said symbols of language in an arrangement corresponding to the arrangement of said glyphs in said communication to replicate the informational content of said communication.

34. The method of claim 33, further comprising the step of substituting computer recognizable code for each of said symbols of language making up said communication for use of said communication by computer means.

35. The method of claim 34, wherein said communication comprises a document and wherein said step of sensing and inputting a stream of data indicative of the glyphs of said communication is accomplished by converting said document into a bit-mapped representation thereof.

36. The method of claim 35, wherein said step of separating said symbolic language into a plurality of glyphs is accomplished by horizonally segmenting said bit-mapped representation into horizontal lines of text and then vertically segmenting each of said lines into said glyph elements.

37. The method of claim 36, wherein the step of assigning unique identifiers to each set of substantially identical glyphs is achieved by identifying various physical characteristics of each of said glyphs and then determining which of said glyphs are substantially identical to other of said glyphs.

38. The method of claim 37, wherein said pattern grouping means further comprises the step of arranging said identifiers into a plurality of individual sequences, wherein each of said individual sequences corresponds to a particular word in said language.

39. The method of claim 35, further comprising the step of analyzing said document including the arrangement of glyphs and groups of glyphs on said document, to determine and classify said document as being that of a particular type.

40. The method of claim 39, wherein the step of decrypting said identifiers includes the step of selecting an appropriate set of decryption routines based on said document type classification.

41. The method of claim 40, wherein the decrypting step includes performing of short word analysis, limited dictionary pattern matching and full dictionary pattern matching, where said document has been determined to contain general textual information.

42. The method of claim 40, wherein said decrypting step includes performing geography specific keyword look-ups, short word analysis, limited dictionary pattern matching and full dictionary pattern matching, where said document has been determined to be a business letter.

43. The method of claim 40, wherein said decrypting step includes performing geography specific keyword look-ups, limited dictionary pattern matching and cryptarithm analysis, where said document has been determined to be a financial report.

44. The method of claim 35, wherein the step of decrypting comprises identification of correspondences between glyphs and symbols of language, without relying to a substantial degree on the shape or geometry of the respective glyphs.

45. The method of claim 35, wherein the decrypting step comprises the process of comparing glyph patterns in glyph words with letter patterns in a selected list of keywords.

46. The method of claim 35, wherein the decrypting step comprises the step of analyzing short words to determine correspondences between glyphs and symbols of language contained in words having fewer that five glyph letters.

47. The method of claim 35, wherein the decrypting step comprises the step of performing geography specific keyword look-ups on said page to determine whether certain pre-selected glyph patterns appear at certain predetermined locations on said page.

48. The method of claim 35, wherein the decrypting step comprises the step of identifying those glyphs which correspond to digits and analyzing the context in which those glyphs occur, including their interrelationships with glyphs to determine their digit value.

49. The method of claim 48, wherein said interrelationships include mathematical relationships.

* * * * *